(12) United States Patent
Nishikawa

(10) Patent No.: US 8,514,447 B2
(45) Date of Patent: Aug. 20, 2013

(54) IMAGE PROCESSING USING FIRST AND SECOND COLOR MATCHING

(75) Inventor: Naoyuki Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 11/422,470

(22) Filed: Jun. 6, 2006

(65) Prior Publication Data

US 2006/0274974 A1 Dec. 7, 2006

(30) Foreign Application Priority Data

| Jun. 7, 2005 | (JP) | 2005-167343 |
| Jun. 7, 2005 | (JP) | 2005-167344 |
| Jun. 7, 2005 | (JP) | 2005-167345 |

(51) Int. Cl.
*G06F 15/00* (2006.01)

(52) U.S. Cl.
USPC ........................................... 358/1.9

(58) Field of Classification Search
USPC ......................................... 382/284; 358/1.9
See application file for complete search history.

(56) References Cited

U.S. PATENT DOCUMENTS

| 6,515,675 | B1 * | 2/2003 | Bourdev | 345/629 |
| 6,650,771 | B1 * | 11/2003 | Walker | 382/162 |
| 6,903,751 | B2 * | 6/2005 | Saund et al. | 345/619 |
| 7,019,755 | B2 * | 3/2006 | Krueger et al. | 345/589 |
| 7,027,184 | B2 | 4/2006 | Matsui | |
| 7,212,635 | B2 | 5/2007 | Nishikawa | 380/213 |
| 2003/0117636 | A1 | 6/2003 | Nishikawa | 358/1.9 |
| 2005/0280847 | A1 * | 12/2005 | Cairns et al. | 358/1.9 |
| 2006/0139668 | A1 | 6/2006 | Nishikawa | 358/1.9 |

FOREIGN PATENT DOCUMENTS

| JP | 11-110519 | 4/1999 |
| JP | 2001-117727 | 4/2001 |
| JP | 2002-16783 | 1/2002 |

OTHER PUBLICATIONS

Wataru, Jap. Pub. 11-110519, Apr. 1999, Japan (Foreign Patent Translation).*
Porter, "Compositing Digital Images," Jul. 1984, ACM SIGGRAPH Computer Graphics, vol. 18, Issue 3.*
Office Action dated Jan. 21, 2011 in JP 2005-167343.
Office Action dated Feb. 17, 2010 in JP 2005-167345.

* cited by examiner

*Primary Examiner* — Jeremiah Bryar
(74) *Attorney, Agent, or Firm* — Fitzpatrick, Cella, Harper & Scinto

(57) ABSTRACT

There is provided an image processing method for, when performing color space transformation from a first color space to a second color space for an object such as characters and graphics, performing synthesis color processing for objects in different colors, in which matching processing is performed for the objects in different colors by different matching methods; and synthesis color processing is performed for the objects in different colors for which the matching processing has been performed by the different matching methods.

6 Claims, 14 Drawing Sheets

IMAGE PROCESSING USING FIRST AND SECOND COLOR MATCHING

FIELD OF THE INVENTION

The present invention relates to a technique for performing synthesis color processing of objects in different colors, when color space transformation from a first color space to a second color space is performed for objects such as characters and graphics.

BACKGROUND OF THE INVENTION

Conventionally, in a color printer for printing graphics or image data, color data to be handled is given as RGB values specified by a color mode or a command in the case of a graphics. In the case of image data, the data is given in an RGB dot sequential format or an RGB frame sequential format. Color space for handling color data is not limited to RGB, but there exist YMC color space specific to color printers (depending on ink characteristics), and XYZ color space defined by CIE and the like.

In any case, when printing is performed inside a color printer, inputted data is subject to color reproduction processing corresponding to the color space defined by the color printer (for example, conversion from RGB to YMCK), and then actual print output is performed.

In general, to match colors in the color data handled by a color printer described above with those in color data handled by a color scanner or a color display such as a CRT, a reference color space is used to perform color correction appropriate for respective luminescence (color development) characteristics for each of the color printer and the color scanner or color display.

In this case, the color processing performed in the color printer is in accordance with the reference color space so that, for example, an image displayed on a color display can be outputted to faithfully reproduce it with the color printer.

For example, in order to handle the same color data in devices such as a color scanner, a color display and a color printer, a reference color space, that is, a device-independent color space is defined. After color signals used in the color scanner, the display, and the like are temporarily converted to the device-independent color space, the color space transformation processing corresponding to each device is used to convert the color space to the one specific to each device, so that the color matching can be realized among the devices.

Actually, it is difficult to seek perfect colorimetric matching, since the color reproduction ranges of respective devices are different from one another because of the physical characteristics the devices originally have. In general, color correction is used so that color difference is minimized by a color-difference formula typified by CIE1976 L*a*b* and the like.

However, numerous color-difference formulas for evaluating whether two colors expressed on different media, such as a screen of a color display and recording paper of a color printer, are equal or not have been proposed. The fact is, however, that there is no such thing as an absolute color-difference formula, and in many cases, the color-difference formulas are selected depending on the purpose of use.

Similarly, there also exist some color reproduction methods, which are also selected depending on the purpose of use. When the above-described color matching is considered, the evaluation method naturally differs depending on what color reproduction is desired. Especially, in a color printer, the color reproduction method is an important factor which influences the quality of an outputted printed matter. Generally, the CIE1976 L*a*b* formula or the like, as described above, to perform correction so as to minimize color difference arisen before or after color matching is used. This method is effective when color reproduction of color data read from a color scanner is performed by a color printer. The reason is that the original source is a reflective source (color reproduced on paper) and it is relatively easy to reproduce it with inks of a printing apparatus. Since the physical color development mechanism is essentially the same, color reproduction is easy in comparison with other media though there are problems of difference in ink characteristics and of ink density (tone).

However, in the case of such color as glows on the screen of a display, the physical characteristics themselves are different from those of a reflective source, and there are limitations in seeking for color reproduction by a common color-difference formula. When an image outputted by such a medium is a natural image, color reproduction (rendering intent) generally referred to as preferred matching is often utilized. The preferred matching is used to achieve, away from the viewpoint of whether the reproduced image is isochromatic with the original image, more preferable color reproduction for the most important some colors (for example, human flesh color) in the image.

However, even though such color reproduction is effective in the case of handling data like a natural image, the color reproduction which does not take account of isochromatism may cause trouble in the case of handling data like a computer graphics (CG) image.

If color reproduction processing (rendering intent) can be changed according to data to be processed, the above-described problems can be solved. Thus, a polychrome printing apparatus can be provided which is capable of performing print output with a better image quality by selecting color reproduction processing appropriate for the data to be handled.

However, in the conventional example described above, a problem remains in that it is not possible to clearly define which rendering should be selected and applied even if it is attempted to synthesize the data by applying a different rendering for processing data in which CG data and image data are synthesized.

SUMMARY OF THE INVENTION

An object of the present invention is to realize more natural color reproduction by performing matching processing for objects in different colors by different matching methods to perform synthesis color processing.

Another object of the present invention is to efficiently perform the synthesis color processing for objects in different colors.

Still another object of the present invention is to perform the synthesis color processing in accordance with a specified workflow to realize efficient color reproduction.

In order to achieve the above objects, there is provided an image processing method comprising: a step of performing matching processing for different objects by different matching methods; and a synthesis color processing step of performing synthesis color processing according to transparency attributes, for the different objects for which the matching processing has been performed by the different matching methods according to an aspect of the present invention.

Other objects of the present invention will be apparent from the drawings below and the detailed description to be given later.

DETAILED DESCRIPTION OF THE PREFERRED EMBODIMENTS

The best embodiments for embodying the invention will be described below in detail with reference to drawings.

[First Embodiment]

In a first embodiment, description will be made on the case of color processing where graphics data and a picture image is synthesized.

Figure 1:
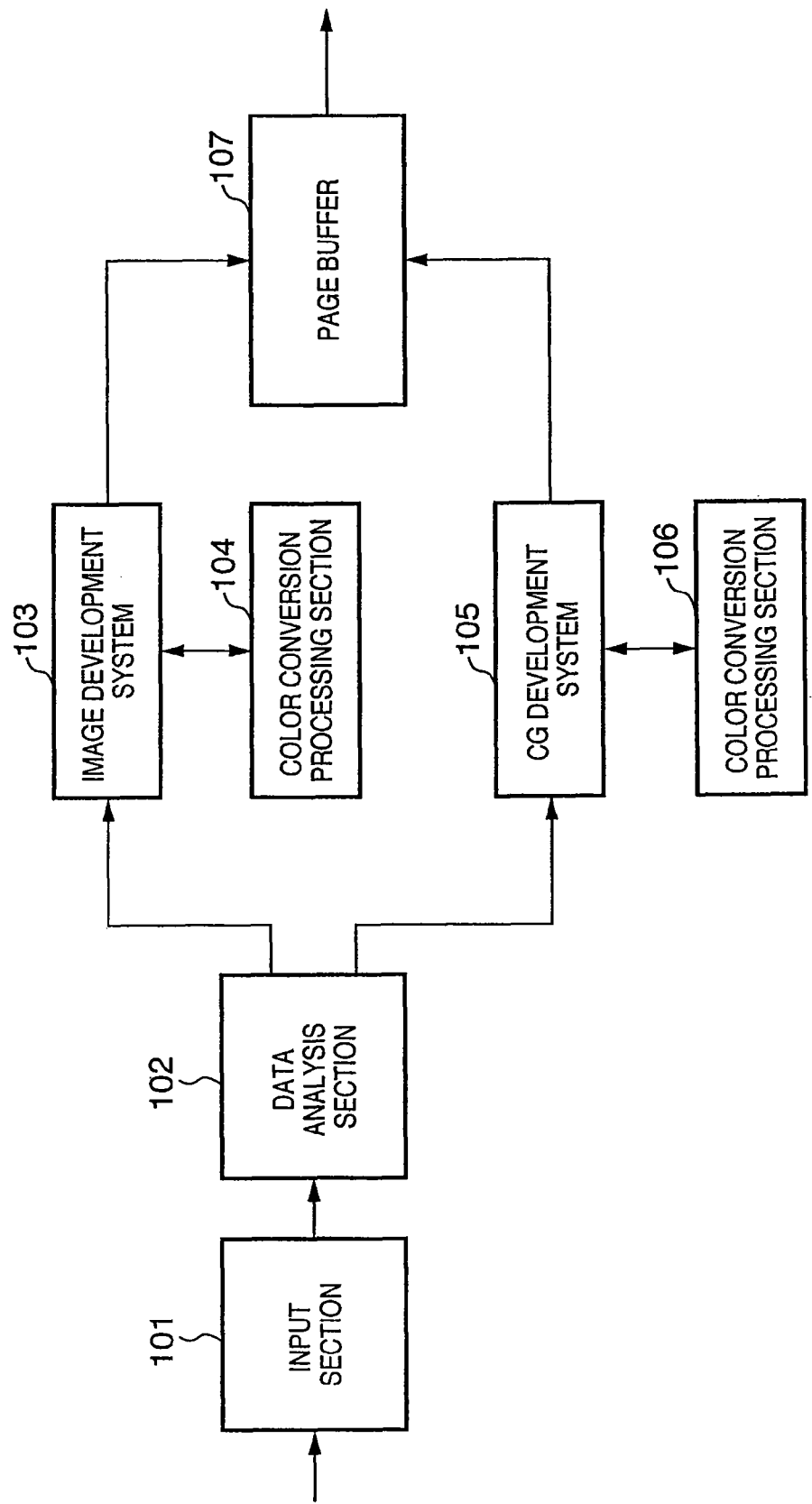
FIG. 1 shows main processing related to the color processing in a first embodiment.

FIG. 1 shows main processing related to the color processing in a first embodiment. As shown in FIG. 1, input data is temporarily stored in an input section 101 first and then sent to a data analysis section 102. At the data analysis section 102, it is analyzed what kind of data the data object to be processed is. Specifically, the data format of the input data is recognized, and the data object is analyzed to be image data if the pixel size and the RGB values of respective pixels are arranged in a dot sequential format. If data indicating the kind of graphics, RGB data about the coordinate values and color specification values of the graphics, and the like are written in a CG data format, then the data is analyzed to be CG data.

Next, based on the result of the analysis at the data analysis section 102, the input data is sent to a development system appropriate for processing of the data. That is, if the result of the analysis at the data analysis section 102 indicates that the data is image data, then the input data is sent from the data analysis section 102 to an image development system 103. Then, at the image development system 103, the data is converted to YMC data with reference to the color conversion processing section 104, developed to rendering data and rendered in a page buffer 107.

As a result of the analysis at the data analysis section 102, if it is determined that the data object is CG data, then the input data is sent from the data analysis section 102 to a CG development system 105. Then, the data is converted to YMC data with reference to a color conversion processing section 106, developed to rendering data and rendered in a page buffer 107.

Here, description will be made on a case where the above-described color processing is executed on the front-end server side.

Figure 2:
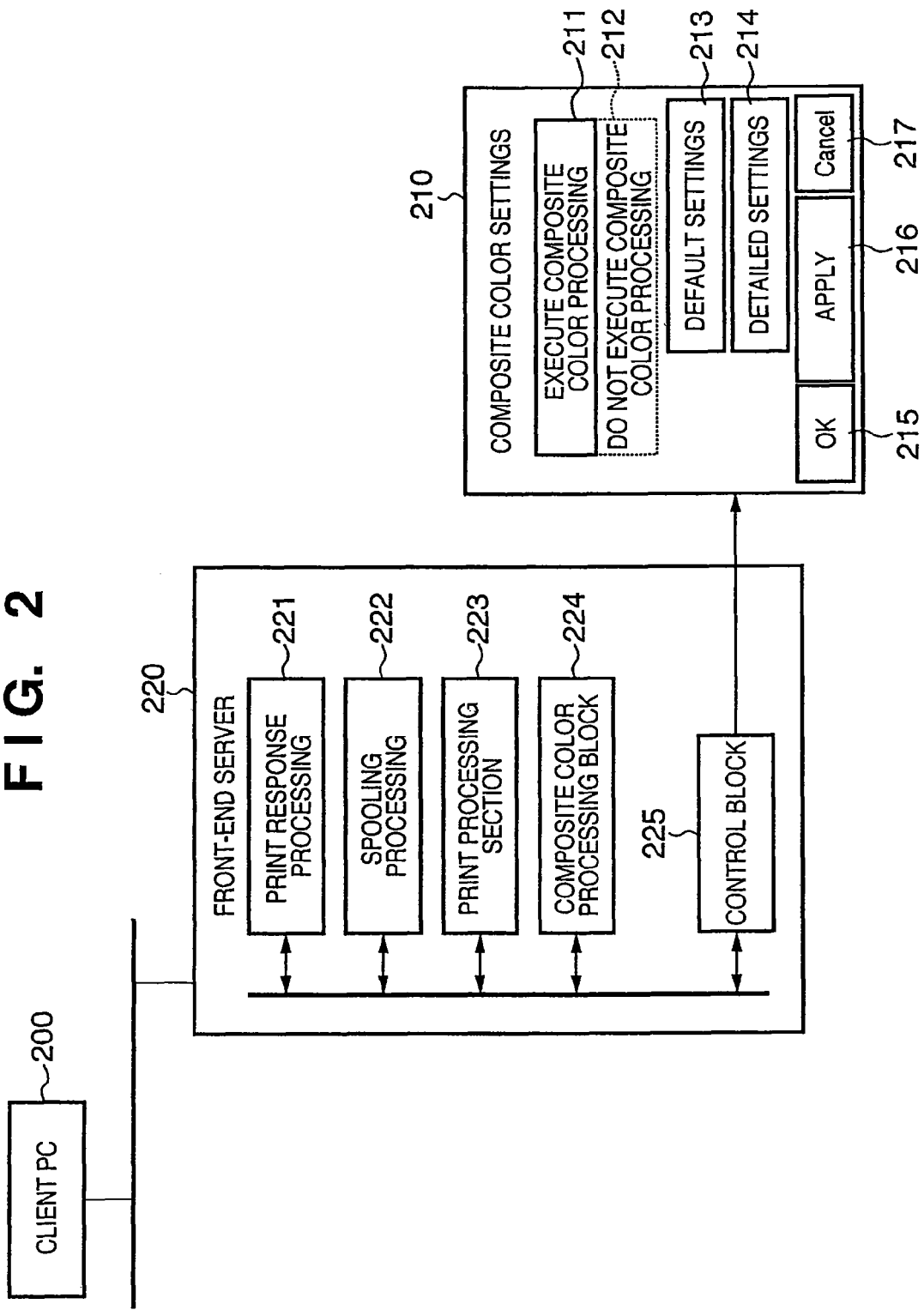
FIG. 2 shows an example of the configuration of a print processing block.

FIG. 2 shows an example of the configuration of a print processing block. Here, configuration is made so that a print job outputted from a client PC 200 is handed to a print processing block 220, and data output to a printer not shown is performed by output processing in the print processing block 220.

As shown in FIG. 2, the print processing block 220 is configured by some internal processing blocks. First, a print response processing block 221 makes a response to a print request from the client PC 200 which is inputted via a network or the like and performs processing for receiving print data sent from the client PC 200. Next, a spooling processing block 222 temporarily stores the print data received by the print response processing block 221 in a spooling area in a server.

A print processing block 223 is in charge of image forming processing for performing printing after performing analysis processing for the print data. A synthesis color processing block 224 determines the value of a composite color to be included in the input data by the calculation processing of this embodiment. A control block 225 is a block for controlling whether or not to execute the calculation processing by the synthesis color processing block 224.

Reference numeral 210 denotes a user interface for enabling a user to make composite color settings, and it is displayed on the display of the front-end server. In the example shown in FIG. 2, instruction buttons of "execute synthesis color processing" 211, "do not execute synthesis color processing" 212, "default settings" 213, "detailed settings" 214, "OK" 215, "apply" 216 and "cancel" 217 are displayed.

Next, description will be made on synthesis processing for synthesizing a picture image and graphics data in different colors when the above-described synthesis color processing is specified.

Figure 3:
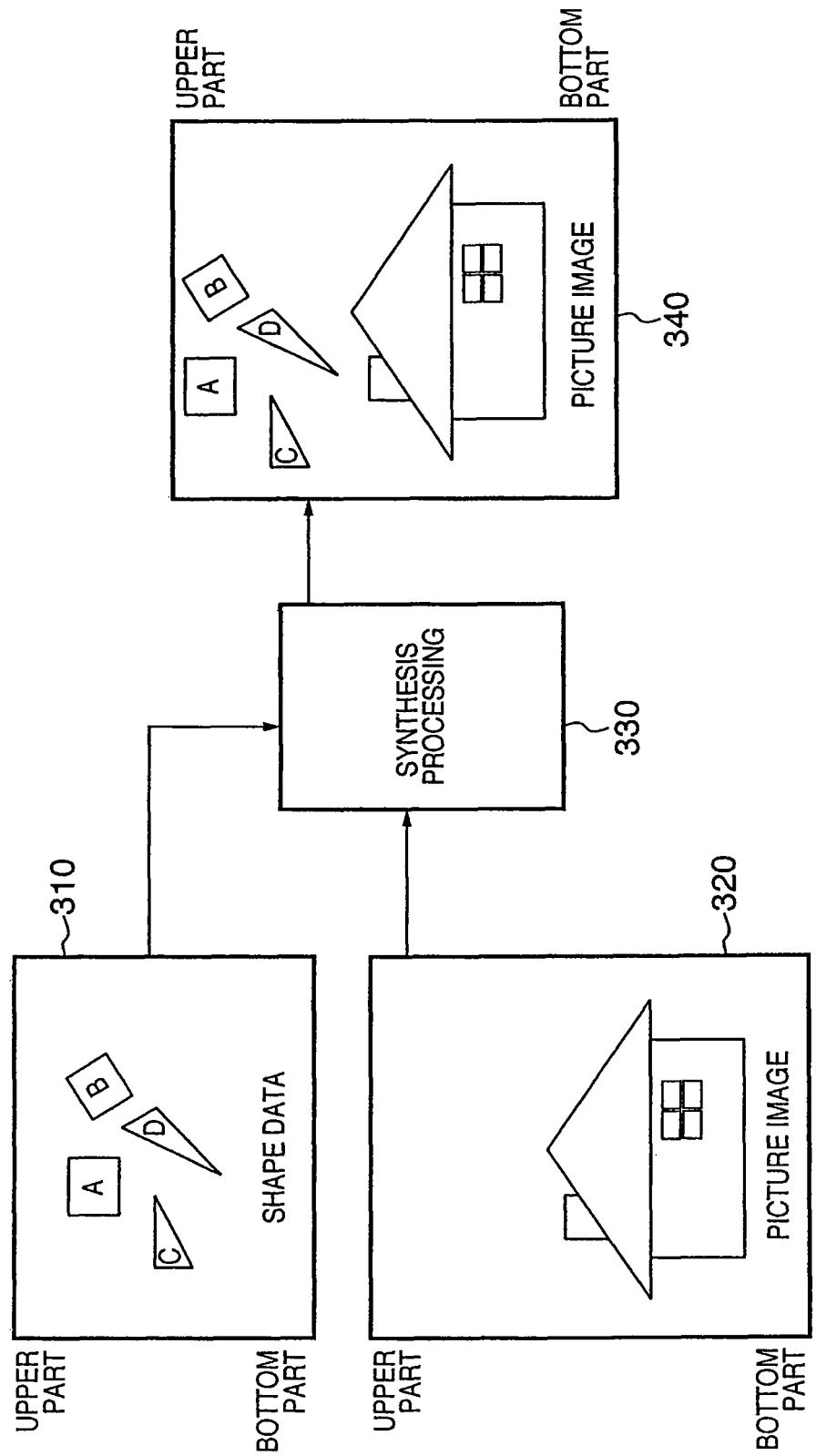
FIG. 3 is a diagram for illustrating synthesis processing for synthesizing a picture image and graphics data.

FIG. 3 is a diagram for illustrating the synthesis processing for synthesizing a picture image and graphics data. Generally, as for a portion of an image to be rendered where colors are overlapped, arithmetic processing can be performed in accordance with any arbitrary arithmetic expression for color mixture. In this example, it is assumed that inputted graphics data A to D 310 have a transparency and synthesis attribute value of α_CG, and a picture image 320 also has a transparency and synthesis attribute value of α_IMG. The transparency and synthesis attribute value is set for each of pixels forming the images, and therefore, when synthesis is performed at a synthesis processing block 330, a synthesized pixel can be calculated for each pixel.

Here, when compared with the α_CG value of the graphics data 310, the α_IMG value of the picture image 320 is relatively low (α_IMG<α_CG) in the upper side area and is gradually high toward the lower side (α_IMG is 0 at the lower coordinate on the image and changes form 0 to α_MAX upward). As a result, it is assumed that, if the graphics data 310 is arranged on the upper side in a synthesized picture image, the graphics data appears at the upper side of the synthesized picture image and the picture image appears at the lower side of the synthesized image as shown in 340.

Figure 4:
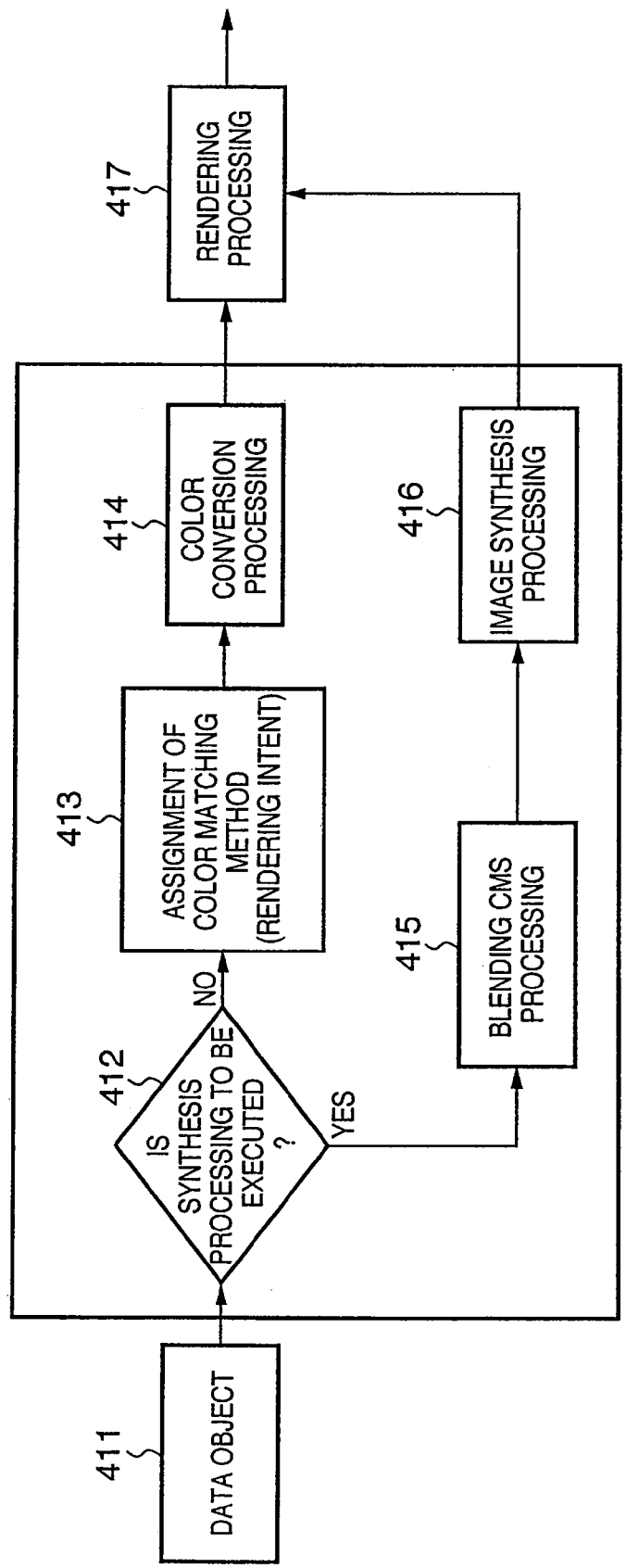
FIG. 4 is a block diagram showing the flow of processing of a data object in the first embodiment.

FIG. 4 is a block diagram showing the flow of processing of a data object in the first embodiment. It is determined by determination processing 412 whether or not to execute synthesis processing for a data object 411, and the data object 411 is separated into a group for which synthesis processing is not to be performed and a group for which synthesis processing is to be performed. At a processing block 413, a predetermined color matching method (rendering intent) is assigned to the data of the group for which synthesis processing is not to be performed. This processing is processing for checking which matching method is specified (for example, priority on brightness, calorimetric match, and priority on saturation) for each object, for example, an image, a graphic or the like, from printer settings information, and setting information for internal processing of the object.

The printer settings information is determined by settings information from "detailed settings" 214 or default settings information of a printer.

Next, color matching processing is performed for the data of the group for which synthesis processing is not to be performed, at a color conversion block 414 appropriately, and after that, the data is handed to a rendering processing block 417, where the data is arranged in a page buffer for printing appropriately by rendering processing to form an image.

Meanwhile, as for the data of the group for which synthesis processing is to be performed, blending (alpha blend, color mixture) color matching processing is performed at a processing block 415. After that, an image is formed by image synthesis at the processing block 416, and then the formed image object is handed to the rendering processing block 417. Then, the image object is arranged in a page buffer for printing appropriately together with the above-described data of the group for which synthesis processing is not to be performed.

Figure 5:
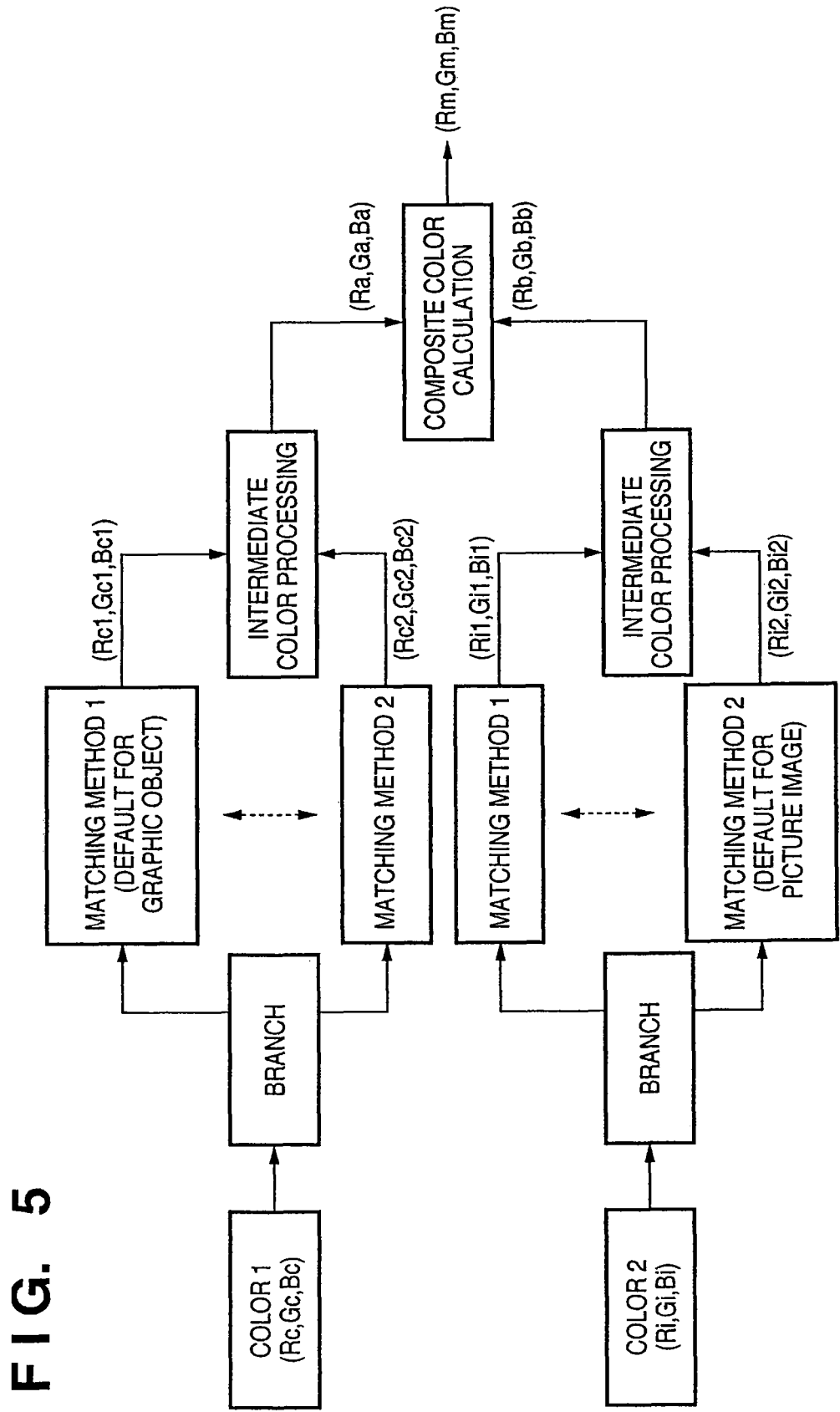
FIG. 5 is a diagram for illustrating blending processing in the first embodiment.

FIG. 5 is a diagram for illustrating the blending color matching processing in the first embodiment. Here, description will be made on the case where there are different objects of different color respectively, and a different color matching method (rendering intent) is specified for each.

When a certain graphics object (for example, a rectangular image) is given, RGB pixels are developed in the rectangular area. Here, it is assumed that the specified color at all the pixels in the rectangular area is a color 1, that (Rc, Gc, Bc) is assigned as the RGB value, and that all the transparency and synthesis attribute values in the area are $\alpha 1$. It is also assumed that this graphics object is treated as a CG image, and that "1" is specified as the matching method thereof.

It is assumed that, when the graphics object is arranged on a print page, it overlaps with the area of the picture image. The picture image is configured by pixel values (RGB), and it is assumed that all the transparency and synthesis attribute values of all the pixels of the picture image are $\alpha 2$. The value "2" is specified as the color matching method therefor.

In order to synthesize the picture image and the graphics data, it is necessary to repeat synthesis calculation for each pixel by referring to the positional information about the pixel appropriately.

Here, description will be made on a calculation method used for the case where the pixel value of the picture image is a color 2, that is, the RGB value is (Ri, Gi, Bi) as an example.

First, by applying the color matching processing of a matching method 1 to the RGB value (Rc, Gc, Bc) of the color 1, (Rc1, Gc1, Bc1) is obtained. It is assumed that, by applying a matching method 2 to the color 1, (Rc2, Gc2, Bc2) is obtained. In this case, an intermediate color Ra, Ga, Ba is determined by the following calculation.

$Ra=(Rc1\times\alpha 1+Rc2\times\alpha 2)/(\alpha 1+\alpha 2)$ $Ga=(Gc1\times\alpha 1+Gc2\times\alpha 2)/(\alpha 1+\alpha 2)$ $Ba=(Bc1\times\alpha 1+Bc2\times\alpha 2)/(\alpha 1+\alpha 2)$ Similarly, by applying the color matching processing of the matching method 2 to the RGB value (Ri, Gi, Bi) of the color 2, (Ri1, Gi1, Bi1) is obtained. It is assumed that, by applying the matching method 2 to the color 2, (Ri2, Gi2, Bi2) is obtained. In this case, an intermediate color Rb, Gb, Bb is determined by the following calculation.

$Rb=(Ri1\times\alpha 1+Ri2\times\alpha 2)/(\alpha 1+\alpha 2)$ $Gb=(Gi1\times\alpha 1+Gi2\times\alpha 2)/(\alpha 1+\alpha 2)$ $Bb=(Bi1\times\alpha 1+Bi2\times\alpha 2)/(\alpha 1+\alpha 2)$ By performing the following calculation based on the values of Ra, Ga, Ba and Rb, Gb, Bb determined as described above, a composite color Rm, Gm, Bm is determined.

$Rm=(Ra\times\alpha 1+Rb\times\alpha 2)/(\alpha 1+\alpha 2)$ $Gm=(Ga\times\alpha 1+Gb\times\alpha 2)/(\alpha 1+\alpha 2)$ $Bm=(Ba\times\alpha 1+Bb\times\alpha 2)/(\alpha 1+\alpha 2)$ Thus, even when different rendering intents are applied to a CG image and a picture image, and it is attempted to synthesize the images, it is possible to correct rendering intent processing.

That is, in color space transformation for performing transformation from a first color space having (Rc, Gc, Bc), (Ri, Gi, Bi) to a second color space having (Rm, Gm, Bm), which corresponds to multiple intents, a method for continuously and changeably calculating respective coefficients by directly calculating them is provided. Then, this processing can be utilized inside processing for synthesizing transparency attributes to provide effective color reproduction. Accordingly, even when the color changes in each color object, smooth color change can be held, and an image giving a natural impression can be formed.

[Second Embodiment]

Next, a second embodiment of the present invention will be described in detail with reference to drawings.

In the first embodiment, description has been made with the case of synthesizing graphics data and a picture image as an example. In the second embodiment, description will be made on the case where two graphics data are synthesized.

Figure 6:
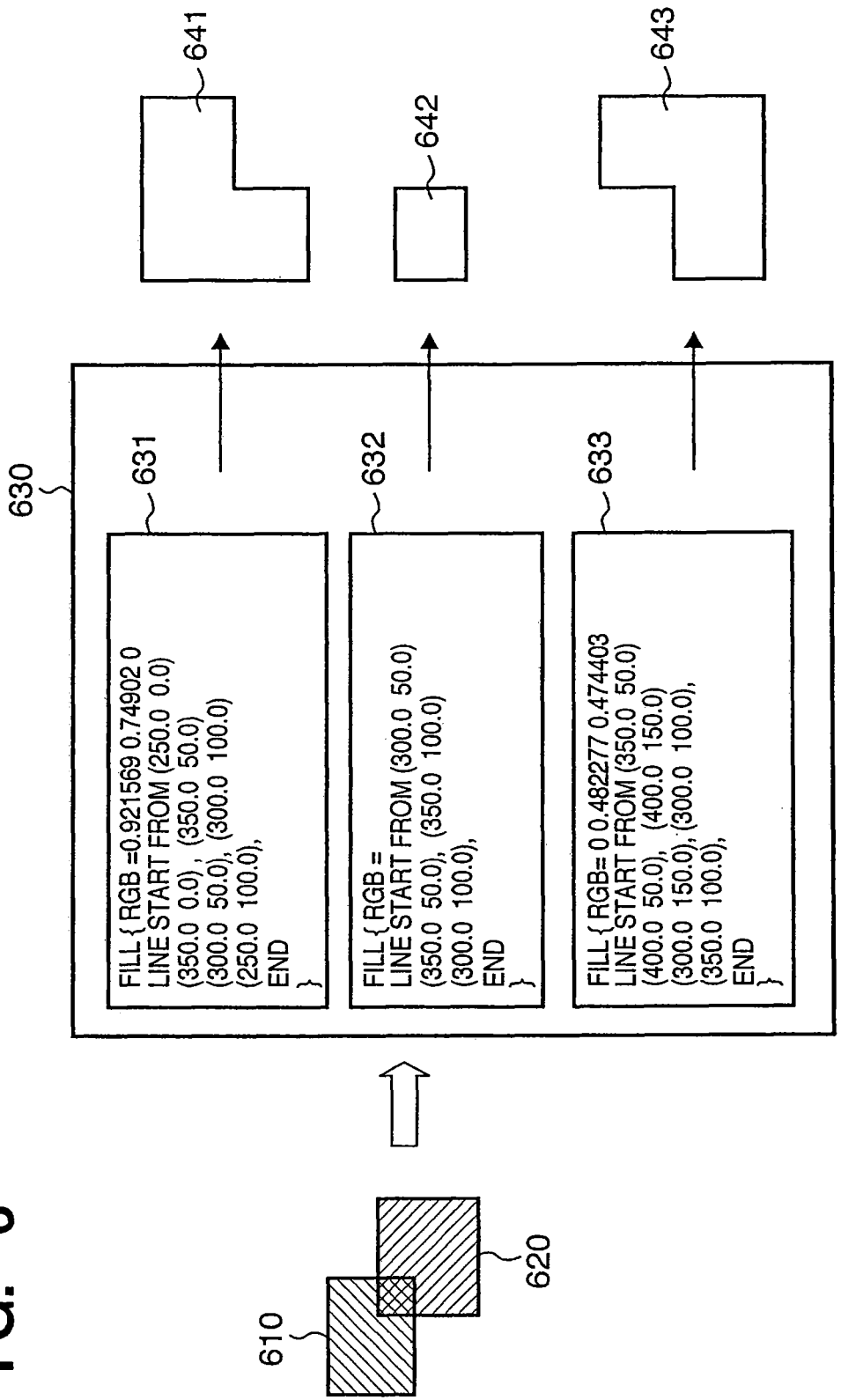
FIG. 6 is a diagram for illustrating synthesis processing for synthesizing two graphics data.

FIG. 6 is a diagram for illustrating the synthesis processing for synthesizing two graphics data. Generally, as for a portion of an image to be rendered where colors are overlapped, arithmetic processing can be performed in accordance with any arbitrary arithmetic expression for color mixture. In this example, two graphics 610 and 620 are inputted as images, and it is assumed that one graphics 610 has a transparency and synthesis attribute value of $\alpha\_CG1$, and the other graphics 620 has a transparency and synthesis attribute value of $\alpha\_CG2$. The transparency and synthesis attribute value of each graphics is set for each pixel, and therefore, it is possible to, when performing synthesis, perform calculation of a synthesized pixel for each pixel.

Since the color matching processing for an overlapping portion 642 and that for the other portions 641 and 643 are different, processing for division into areas 631 to 633 is performed appropriately, as shown in FIG. 6. In the second embodiment, this division processing is performed appropriately by a printer which has received the data.

In the printer, for the objects 632 divided and corresponding to the overlapping area, the type of the data (TYPE), the number of overlaps, (NUMBER OF OBJECT) and the original colors (RGB1, RGB2 . . . ) of the overlapped objects are recorded to be used for the subsequent-stage color matching processing, and, for example, the following data structure is generated.

```
FILL {
    TYPE = COMPOSITING
    NUMBER OF OBJECT WAS = 2
    RGB1 =0.458824 0.733334 0, INTENT = CM1
    RGB2 =0.0 0.458824 0.733334, INTENT = CM2
    LINE START FROM (300.0 50.0) (350.0 50.0), (350.0
    100.0) (300.0 100.0)
    END
}
```

Figure 7:
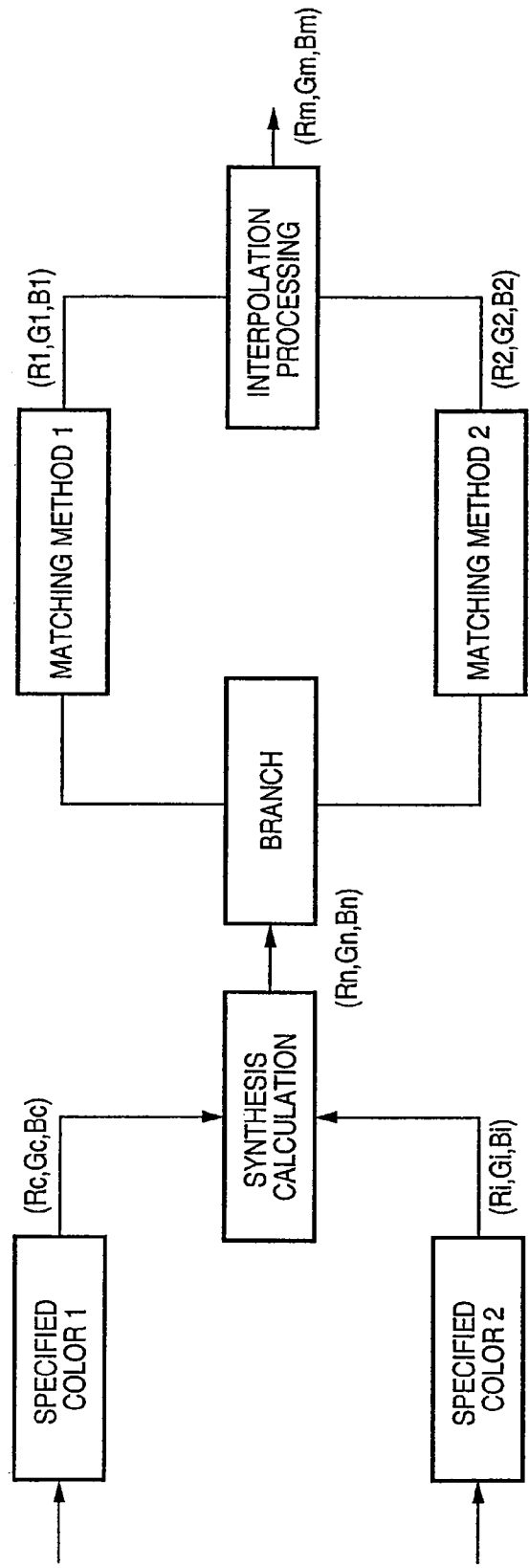
FIG. 7 is a diagram for illustrating blending processing in a second embodiment.

The above-described data is to be handed to the subsequent-stage color matching processing as shown in FIG. 7. The color matching processing is similar to that in the first embodiment, and description thereof will be omitted.

FIG. 7 is a diagram for illustrating the alpha blending processing in the second embodiment. Here, description will be made on the case where there are two colors of different objects, and a different color matching method (rendering intent) is specified for each.

When a certain graphics object (for example, a rectangular image) is given, rendering of the image is once performed, and RGB pixels are developed in the rectangular area. Here, it is assumed that all the pixels in the rectangular area is the specified color 1, that (Rc, Gc, Bc) is assigned as the RGB value, and that all the transparency and synthesis attribute values in the area are $\alpha 1$. It is also assumed that this graphics object is treated as a CG image, and that "1" is specified as the matching method thereof.

It is assumed that, when the graphics object is arranged on a print page, it overlaps with the area of a second graphics image due to their positional relation. The second graphics image is configured by pixel values (RGB), and it is assumed that all the transparency and synthesis attribute values of all the pixels of the CG image are $\alpha 2$. The value "2" is specified as the color matching method thereof.

In order to synthesize first and second graphics data, it is necessary to repeat synthesis calculation for each pixel by referring to the positional information about the pixel appropriately.

In FIG. 7, description will be made on a calculation method, using the case where the pixel value of the second graphics image is a color 2, that is, where the RGB value is (Ri, Gi, Bi) as an example.

First, the following calculation is performed for the RGB value (Rc, Gc, Bc) of the color 1 and the RGB value (Ri, Gi, Bi) of the color 2 to determine a composite color Rn, Gn, Bn.

$$Rn=(Rc\times\alpha 1+Ri\times\alpha 2)/(\alpha 1+\alpha 2)$$

$$Gn=(Gc\times\alpha 1+Gi\times\alpha 2)/(\alpha 1+\alpha 2)$$

$$Bn=(Bc\times\alpha 1+Bi\times\alpha 2)/(\alpha 1+\alpha 2)$$

Next, color matching processing is executed. By applying the color matching processing of a matching method 1 to the Rn, Gn, Bn obtained here, (R1, G1, B1) is obtained. Separately from this, the color matching processing of a matching method 2 is applied to the Rn, Gn, Bn already obtained. By this calculation, (R2, G2, B2) is obtained similarly.

Then, the following calculation is applied to the two obtained RGB values, that is, (R1, G1, B1) and (R2, G2, B2).

$$Rm=(R1\times\alpha 1+R2\times\alpha 2)/(\alpha 1+\alpha 2)$$

$$Gm=(G1\times\alpha 1+G2\times\alpha 2)/(\alpha 1+\alpha 2)$$

$$Bm=(B1\times\alpha 1+B2\times\alpha 2)/(\alpha 1+\alpha 2)$$

Since Rm, Gm, Bm obtained here is a suitable color value in the overlapping area, configuration can be made so that rendering processing inside the printer is executed with the use of this value.

Thus, even when different rendering intents are applied to multiple objects, and it is attempted to synthesize the objects, it is possible to perform correct rendering intent processing.

That is, in color conversion for performing conversion from a first color space to a second color space, which corresponds to multiple intents, calculation of a composite color is performed first, and after that, each of the color matching processing of the method 1 and the color matching processing of the method 2 is carried out on the obtained composite color. Calculation is performed on two different color matching colors obtained thereby with a weighting factor configured by a transparency attribute value. As a result, effective color reproduction can be realized. Accordingly, even when color changes in each color object, smooth color change can be held, and an image giving a natural impression can be formed.

[Third Embodiment]

Next, a third embodiment according to the present invention will be described in detail with reference to drawings.

Description will be made on synthesis processing for synthesizing two images in different colors performed when synthesis color processing, such as the first embodiment or the second embodiment, is specified from a user interface displayed on the display of a client PC or a front-end server, as the third embodiment. The main processing related to the color processing in the third embodiment are similar to color matching processing using transparency attributes described in the first and second embodiments with reference to FIGS. 1, 2, 3 and 6, and description thereof will be omitted.

Here, description will be made on the synthesis color processing performed in the case of executing the above-described synthesis color processing in cooperation with the printer driver of a client PC.

Figure 8:
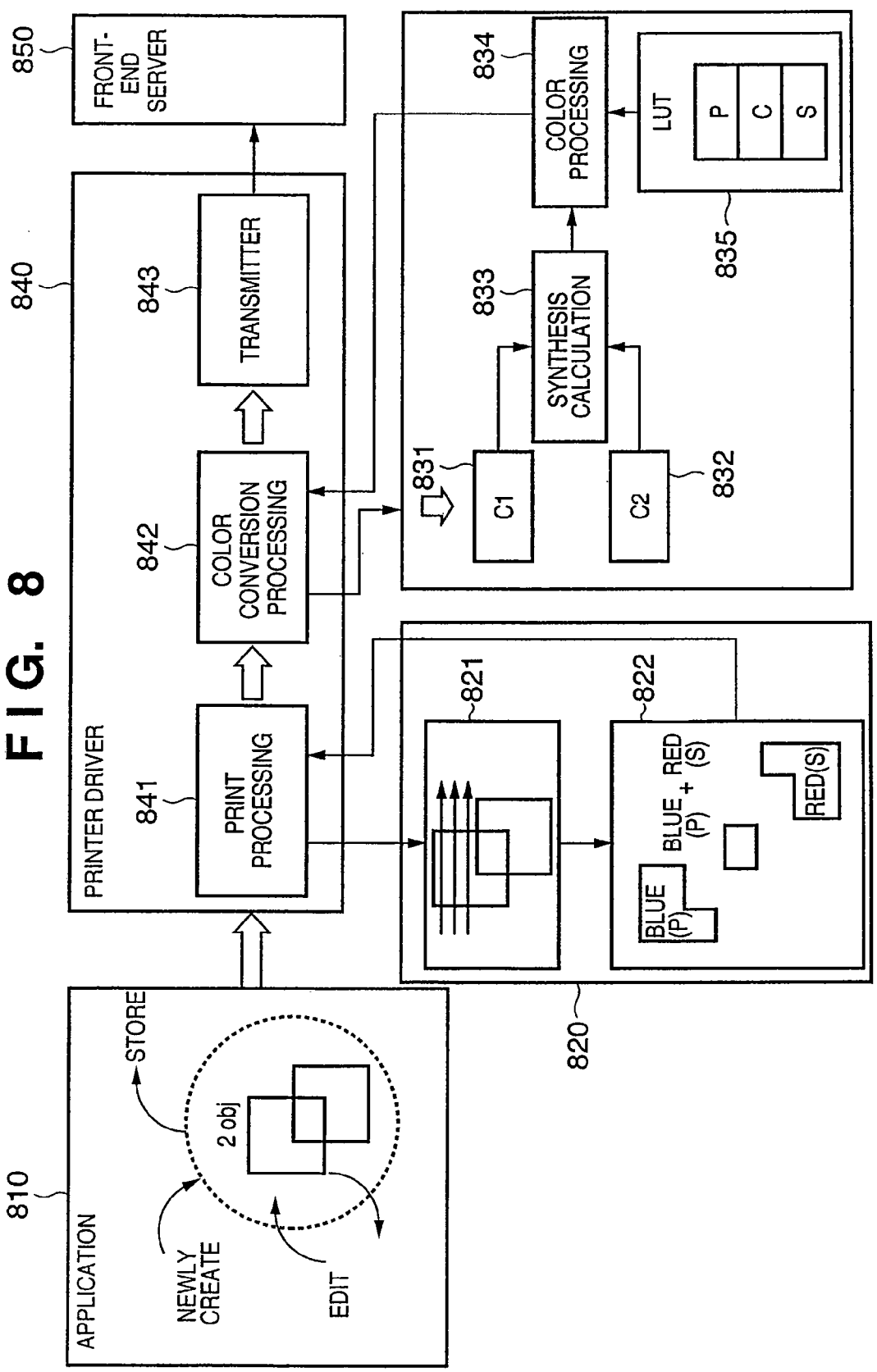
FIG. 8 is a block diagram showing the flow of processing of a data object in a third embodiment.

FIG. 8 is a block diagram showing the flow of processing of a data object in the third embodiment. In FIG. 8, a document to be processed is created by a user selecting "newly create" from the application menu, and selecting and arranging objects such as characters and graphics. As shown in FIG. 8, it is possible to perform editing work such as changing the form or arrangement of each object and store the document at appropriate timing during the creation thereof as required.

Here, description will be made on the case where an object such as a graphic overlaps with another object during data processing for printing a document. When print processing is started by an application 810, a printer driver 840 is activated, and data on the application 810 is handed to a print processing block 841. The print processing block 841 is configured to, when processing an object with a transparency attribute, hand the data to a division block 820.

In the division block 820, search for an area where data is to be divided is executed at a data scan block 821 first. Then, at a divided data creation block 822, the data is reconfigured to create divided data, as described in the second embodiment (FIG. 6). In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
    TYPE = COMPOSITING
    NUMBER OF OBJECT WAS = 2
    RGB1 =0.458824 0.733334 0, INTENT = CM1
    RGB2 =0.0 0.458824 0.733334, INTENT = CM2
    LINE START FROM (300.0 50.0) (350.0 50.0), (350.0
    100.0) (300.0 100.0)
    END
}
```

Next, the object processed at the divided data creation block 822 is returned to the print processing block 841 of the printer driver 840. When an object divided at the division block 820 described above (object with description of TYPE=COMPOSITING) is processed at a color conversion processing block 842, the data is handed to a composite color conversion processing block 830.

Here, as in the first embodiment, description will be made on the case where a different color and a different color matching method (rendering intent) are specified for each of two objects 831 and 832.

When a certain graphics object (for example, a rectangular image) is given, rendering of the image is once performed, and RGB pixels are developed in the rectangular area. Here, it is assumed that the specified color at all the pixels in the rectangular area is a color 1, that the RGB value=(Rc, Gc, Bc) is assigned, and that all the transparency and synthesis attribute values in the area are α1. It is also assumed that this graphics object is treated as a CG image, and that a "priory on hue" method (matching method 1) is specified as the matching method thereof.

It is assumed that, when the graphics object is arranged on a print page, it overlaps with the area of the picture image. The picture image is configured by pixel values (RGB), and it is assumed that all the transparency and synthesis attribute values of all the pixels of the picture image are α2. A "priority on minimum color difference" method (matching method 2) is specified as the color matching method thereof.

In order to synthesize the picture image and the graphics data, it is necessary to repeat synthesis calculation for each pixel by referring to the positional information about the pixel appropriately.

Here, description will be made on a calculation method used for the case where the pixel value of the picture image is a color 2, that is, the RGB value is (Ri, Gi, Bi) as an example.

First, the following calculation is performed for the RGB value (Rc, Gc, Bc) of the color 1 (431) and the RGB value (Ri, Gi, Bi) of the color 2 (832) at synthesis calculation 833 to determine the RGB value (Rn, Gn, Bn) of a composite color.

$$Rn=(Rc\times\alpha1+Ri\times\alpha2)/(\alpha1+\alpha2)$$

$$Gn=(Gc\times\alpha1+Gi\times\alpha2)/(\alpha1+\alpha2)$$

$$Bn=(Bc\times\alpha1+Bi\times\alpha2)/(\alpha1+\alpha2)$$

Next, color matching processing 834 is executed. By applying the color matching processing of a matching method 1 to the Rn, Gn, Bn obtained by the above-described calculation, (R1, G1, B1) is obtained.

Separately from this, the color matching processing of a matching method 2 is applied to the Rn, Gn, En already obtained. By this calculation, (R2, G2, B2) is obtained similarly. Then, the following calculation is applied to the two obtained RGB values, that is, (R1, G1, B1) and (R2, G2, B2).

$$Rm=(R1\times\alpha1+R2\times\alpha2)/(\alpha1+\alpha2)$$

$$Gm=(G1\times\alpha1+G2\times\alpha2)/(\alpha1+\alpha2)$$

$$Bm=(B1\times\alpha1+B2\times\alpha2)/(\alpha1+\alpha2)$$

The (Rm, Gm, Bm) calculated as described above is the value of the color of the overlapping area. Therefore, this result is returned to the color conversion processing block 842 of the printer driver 840 to generate print data. Each of areas for which synthesis processing is not to be performed is separately subject to color matching as in the first embodiment. The print data generated here is sent to a front-end server 850 via a transmitter 843 at appropriate timing.

[Fourth Embodiment]

Next, a fourth embodiment according to the present invention will be described in detail with reference to drawings.

Description has been made on the case where synthesis color processing is executed in cooperation with a printer driver of a client PC in the third embodiment. In the fourth embodiment, description will be made on the case where synthesis color processing is executed by print preprocessing of an application and at a front-end server.

Figure 9:
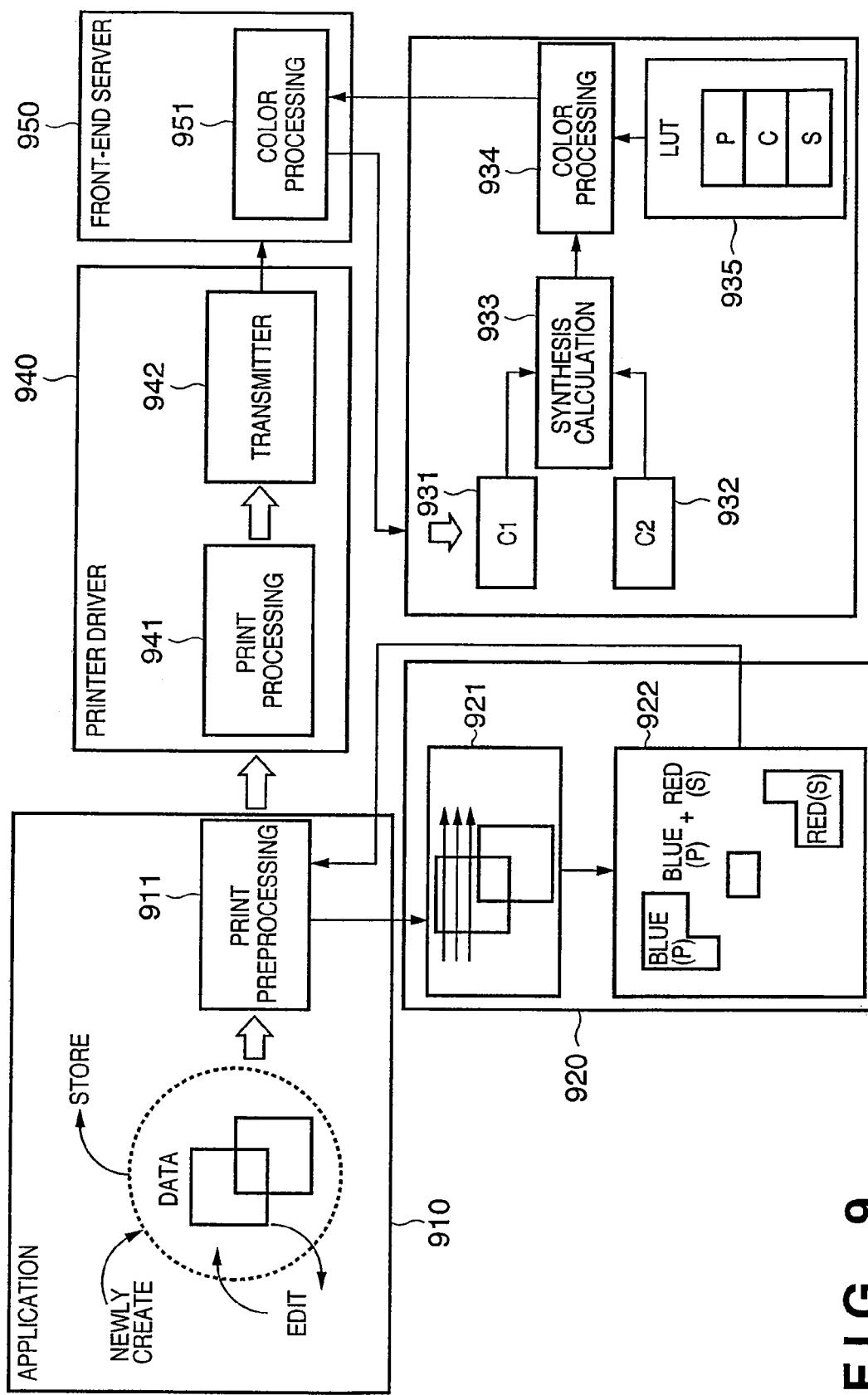
FIG. 9 is a block diagram showing the flow of processing of a data object in a fourth embodiment.

FIG. 9 is a block diagram showing the flow of processing of a data object in the fourth embodiment. In FIG. 9, similarly to the third embodiment, a document is created by a user selecting "newly create" from the application menu, and selecting and arranging objects such as characters and graphics. As shown in FIG. 9, it is possible to perform editing work such as changing the form or arrangement of each object and store the document at appropriate timing during the creation thereof as required.

Here, description will be made on the case where an object such as a graphic overlaps with another object during data processing for printing a document.

When a print instruction is given from an application 910, a print preprocessing block 911 within the application 910 is called. The print preprocessing block 911 is configured to determine whether there is an object with a transparency attribute, a group of objects influenced by the object or data included in a transparency attribute group or not and, if finding data requiring synthesis processing as a result of the determination, hand the data to a division block 920.

In the division block 920, search for an area where data is to be divided is executed at a data scan block 921 first. Then, at a divided data generation block 922, the data is reconfigured based on the above-described processing to create divided data. In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
    TYPE = COMPOSITING
    NUMBER OF OBJECT WAS = 2
    RGB1 =0.458824 0.733334 0, INTENT = CM1
    RGB2 =0.0 0.458824 0.733334, INTENT = CM2
    LINE START FROM (300.0 50.0) (350.0 50.0), (350.0
    100.0) (300.0 100.0)
    END
}
```

Next, the object processed at the division block 920 is returned to the print preprocessing block 911 of the application 910. A data constellation, which is a print job, is handed to a print processing block 941 in a printer driver 940, and it is sent to a front-end server 950 via a transmitter 942 after printer data is generated.

In the front-end server 950, color conversion processing is executed at a color processing block 951 appropriately. However, in the case of processing an object divided at the division block 920 described above (object with description of TYPE=COMPOSITING), the data is handed to a composite color conversion processing block 930.

Here, description will be made on the case where a different color and a different color matching method (rendering intents) is specified for each of two objects.

When a certain graphics object (for example, a rectangular image) is given, RGB pixels are developed in the rectangular area. Here, it is assumed that the specified color at all the pixels in the rectangular area is a color 1, that the RGB value=(Rc, Gc, Bc) is assigned, and that all the transparency and synthesis attribute values in the area are α1. It is also assumed that this graphics object is treated as a CG image, and that a "priory on hue" method (matching method 1) is specified as the matching method thereof.

It is assumed that, when the graphics object is arranged on a print page, it overlaps with the area of the picture image due to their positional relation. The picture image is configured by pixel values (RGB), and it is assumed that all the transparency and synthesis attribute values of all the pixels of the picture image are α2. A "priority on minimum color difference" method (matching method 2) is specified as the color matching method thereof.

In order to synthesize the picture image and the graphics data, it is necessary to repeat synthesis calculation for each pixel by referring to the positional information about the pixel appropriately.

Here, description will be made on a calculation method used for the case where the pixel value of the image is a color 2, that is, the RGB value=(Ri, Gi, Bi) as an example.

First, the following calculation is performed for the RGB value (Rc, Gc, Bc) of the color 1 (931) and the RGB value (Ri, Gi, Bi) of the color 2 (932) at synthesis calculation 533 to determine the RGB value (Rn, Gn, Bn) of a composite color.

$Rn=(Rc×α1+Ri×α2)/(α1+α2)$ $Gn=(Gc×α1+Gi×α2)/(α1+α2)$ $Bn=(Bc×α1+Bi×α2)/(α1+α2)$

Next, color matching processing 934 is executed. By applying the color matching processing of a matching method 1 to the Rn, Gn, Bn obtained by the above-described calculation, (R1, G1, B1) is obtained.

Separately from this, the color matching processing of a matching method 2 is applied to the Rn, Gn, Bn already obtained. By this calculation, (R2, G2, B2) is obtained similarly. Then, the following calculation is applied to the two obtained RGB values, that is, (R1, G1, B1) and (R2, G2, B2).

$Rm=(R1×α1+R2×α2)/(α1+α2)$ $Gm=(G1×α1+G2×α2)/(α1+α2)$ $Bm=(B1×α1+B2×α2)/(α1+α2)$

The (Rm, Gm, Bm) calculated as described above is the value of the color of the overlapping area. Therefore, a print image is formed based on this result.

Thus, even when different rendering intents are applied to multiple objects, and it is attempted to synthesize the objects, it is possible to perform appropriate rendering intent processing.

Consider color conversion for performing conversion from a first color space to a second color space, in which an area for which blending processing is performed corresponds to multiple intents. First, calculation of a composite color is performed as described above, and after that, each of the color matching processing of the method 1 and the color matching processing of the method 2 is performed for the obtained composite color. As a result, based on two different color matching colors obtained thereby, a color value calculated with the color matching colors and a weighting factor configured by a transparency attribute value is utilized, and thereby effective color reproduction can be realized.

In the third and fourth embodiments, a part of the processing is executed by the host side, so that high-speed processing ability of the host computer can be used for blending and color matching processing over the first and second embodiments, enabling high-speed processing. As a result, even when the color changes in each color object, smooth color change can be held, and an image giving a natural impression can be formed.

[Fifth Embodiment]

Next, a fifth embodiment according to the present invention will be described in detail with reference to drawings.

In the fifth embodiment, the above-described color processing is executed by a back-end process of the application side.

Figure 10:
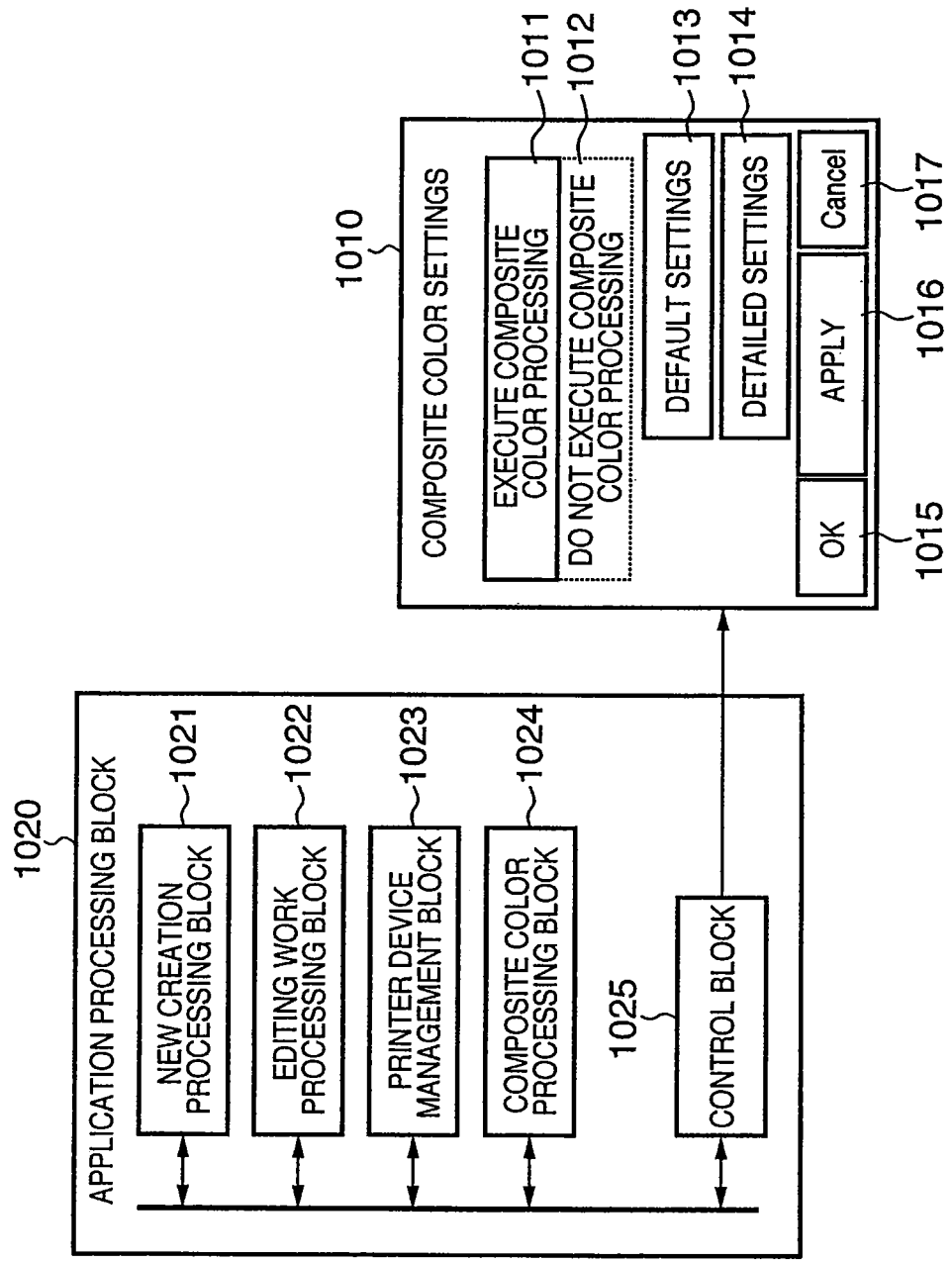
FIG. 10 shows an example of the configuration of an application processing block.

FIG. 10 shows an example of the configuration of an application processing block. As shown in FIG. 10, an application processing block 1020 is configured by some internal processing blocks. First, a new creation processing block 1021 is a block for processing new creation of a document. It secures an area such as a memory when a user instructs a new creation of a document, and performs processing, such as setting various settings information, based on template information for a new document. An editing work processing block 1022 accesses a document currently edited and executes transformation or change of arrangement on objects within the document in accordance with an instruction interactively inputted by the user.

A printer device management block 1023 manages a printer device which is specified as an output target by the document currently created, as information. When a document is newly created, for example, a default printer specified in the system is specified. However, when the printer device is switched during the process of creation or editing of the document, the internal information is updated appropriately.

A synthesis color processing block 1024 determines a value of composite color included in print data by the calculation processing of this embodiment. A control block 1025 is a block which controls whether or not to execute the calculation processing at the synthesis color processing block 1024.

Reference numeral 1010 denotes a user interface for enabling a user to make composite color settings, and it is displayed on the display of a host computer not shown. In the example shown in FIG. 10, instruction buttons of "execute synthesis color processing" 1011, "do not execute synthesis color processing" 1012, "default settings" 1013, "detailed settings" 1014, "OK" 1015, "apply" 1016 and "cancel" 1017 are displayed.

Here, description will be made on the case where the synthesis color processing is executed as a back-end process of an application.

Figure 11:
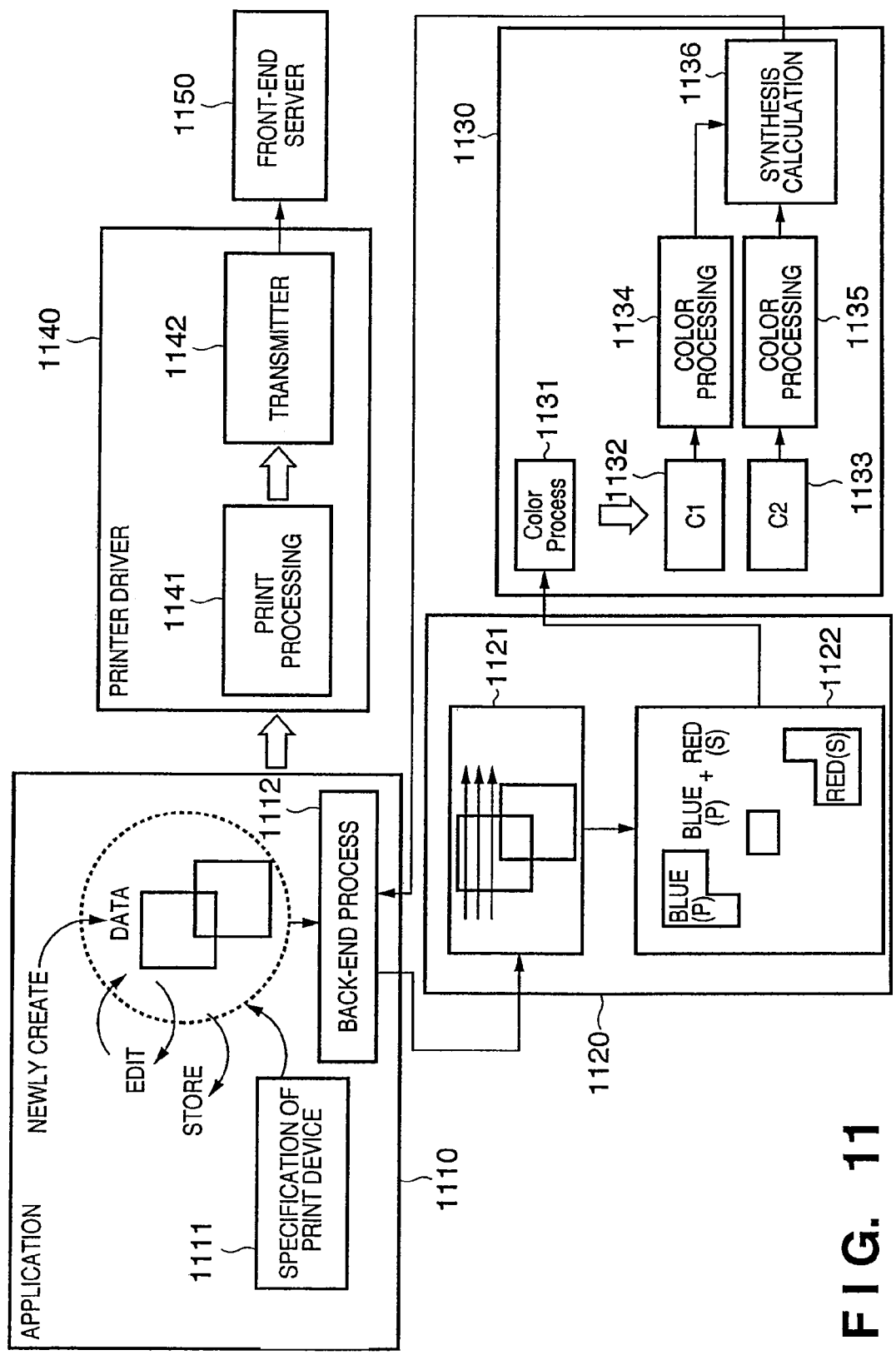
FIG. 11 is a block diagram showing the flow of processing of a data object in a fifth embodiment.

FIG. 11 is a block diagram showing the processing flow in the fifth embodiment. In FIG. 11, a document is created by a user selecting "newly create" from the application menu, and selecting and arranging objects such as characters and graphics. As shown in FIG. 11, it is possible to perform editing work such as changing the form or arrangement of each object and store the document at appropriate timing during the creation thereof as required.

Here, description will be made on the case where, when an object such as a graphic is arranged during the work of creating a document, the object overlaps with an object already arranged. When the object has a transparency attribute, a back-end process 1112 is activated at appropriate timing to execute division processing for the overlapping portion.

The reason for the use of the back-end process 1112 (activation of a different thread) is that the application software must respond quickly to the user operation while each operation by the user (for example, key input, movement of a graphic object and the like) is significantly slow in comparison with the processing speed of the system, a structure in which color image processing is kept waiting while the user operation is being processed would decrease the processing efficiency.

Therefore, by processing a series of processes for executing extraction of an overlapping portion or color image processing for the portion, with the use of the back-end process 1112 as in the fifth embodiment, the system efficiency can be improved.

When the back-end process 1112 is activated, appropriate object data is handed to a division block 1120 appropriately.

In the division block 1120, search for an area where data is to be divided is executed first at a data scan block 1121. Then, at a divided data creation block 1122, the data is reconfigured to create divided data, as described in the second embodiment (FIG. 6). In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
  WORK FLOW ID = 1
  TYPE = COMPOSITING
  NUMBER OF OBJECT WAS = 2
  RGB1 =0.458824 0.733334 0, INTENT = CM1
  RGB2 =0.0 0.458824 0.733334, INTENT = CM2
  LINE START FROM (300.0 50.0) (350.0 50.0), (350.0
  100.0) (300.0 100.0)
  END
}
```

Next, the object processed at the division block 1120 is handed to an image synthesis processing block 1130, and color synthesis processing is performed. Here, description will be made on the case where a different color and a different color matching method (rendering intent) are specified for each of two objects.

When a certain graphics object (for example, a rectangular image) is given, RGB pixels are developed in the rectangular area. Here, it is assumed that the specified color at all the pixels in the rectangular area is a color 1, that the RGB value=(Rc, Gc, Bc) is assigned, and that all the transparency and synthesis attribute values in the area are $\alpha 1$. It is also assumed that this graphics object is treated as a CG image, and that a "priory on hue" method (matching method 1) is specified as the matching method thereof.

It is assumed that, when the graphics object is arranged on a print page, it overlaps with the area of the picture image due to their positional relation. The picture image is configured by pixel values (RGB), and it is assumed that all the transparency and synthesis attribute values of all the pixels of the picture image are $\alpha 2$. A "priority on minimum color difference" method (matching method 2) is specified as the color matching method thereof.

In order to synthesize the picture image and the graphics data, it is necessary to repeat synthesis calculation for each pixel by referring to the positional information about the pixel appropriately.

Here, description will be made on a calculation method used for the case where the pixel value of the image is a color 2, that is, the RGB value=(Ri, Gi, Bi) as an example.

First, the following calculation is performed for the RGB value (Rc, Gc, Bc) of the color 1 and the RGB value (Ri, Gi, Bi) of the color 2 to determine the RGB value (Rn, Gn, Bn) of a composite color.

$$Rn=(Rc \times \alpha 1 + Ri \times \alpha 2)/(\alpha 1 + \alpha 2)$$

$$Gn=(Gc \times \alpha 1 + Gi \times \alpha 2)/(\alpha 1 + \alpha 2)$$

$$Bn=(Bc \times \alpha 1 + Bi \times \alpha 2)/(\alpha 1 + \alpha 2)$$

Next, color matching processing 1143 is executed. By applying the color matching processing of a matching method 1 to the Rn, Gn, Bn obtained by the above-described calculation, (R1, G1, B1) is obtained.

Separately from this, the color matching processing of a matching method 2 is applied to the Rn, Gn, Bn already obtained. By this calculation, (R2, G2, B2) is obtained similarly. Then, the following calculation is applied to the two obtained RGB values, that is, (R1, G1, B1) and (R2, G2, B2).

$$Rm=(R1 \times (\alpha 1 \cdot W1) + R2 \times (\alpha 2 \cdot W2))/((W1 \cdot \alpha 1) + (\alpha 2 \cdot W2))$$

$$Gm=(G1 \times (\alpha 1 \cdot W1) + G2 \times (\alpha 2 \cdot W2))/((W1 \cdot \alpha 1) + (\alpha 2 \cdot W2))$$

$$Bm=(B1 \times (\alpha 1 \cdot W1) + B2 \times (\alpha 2 \cdot W2))/((W1 \cdot \alpha 1) + (\alpha 2 \cdot W2))$$

Wi (i=1, 2) is a weighting factor for each matching method, and it is associated with a workflow ID. For example, when the workflow ID is 1, the weighting factor of W1=1.0 is applied to the "priory on hue" method, and when the workflow ID is 2, the weighting factor of W1=0.5 is applied to the "priory on hue" method. The workflow IDs will be described in a seventh embodiment in detail.

The (Rm, Gm, Bm) calculated as described above is the value of the color of the overlapping area. This result is returned to the back-end process 1112 of an application 1110 and stored within the document data as one of data elements constituting the document. When printing of the document is started by the application 1110, the data is handed to a printer driver 1140, and print data is created by print processing 1141 and handed to a front-end server 1150 from a transmitter 1142. At the front-end server 1150, rendering processing is executed appropriately to form a print image.

[Sixth Embodiment]

Next, a sixth embodiment according to the present invention will be described in detail with reference to drawings.

The sixth embodiment is configured so that the above-described color processing is executed by a back-end process on the application side similarly to the fifth embodiment.

The configuration of application processing blocks is similar to that shown in FIG. 10 and described in the fifth embodiment, and description thereof will be omitted.

Figure 12:
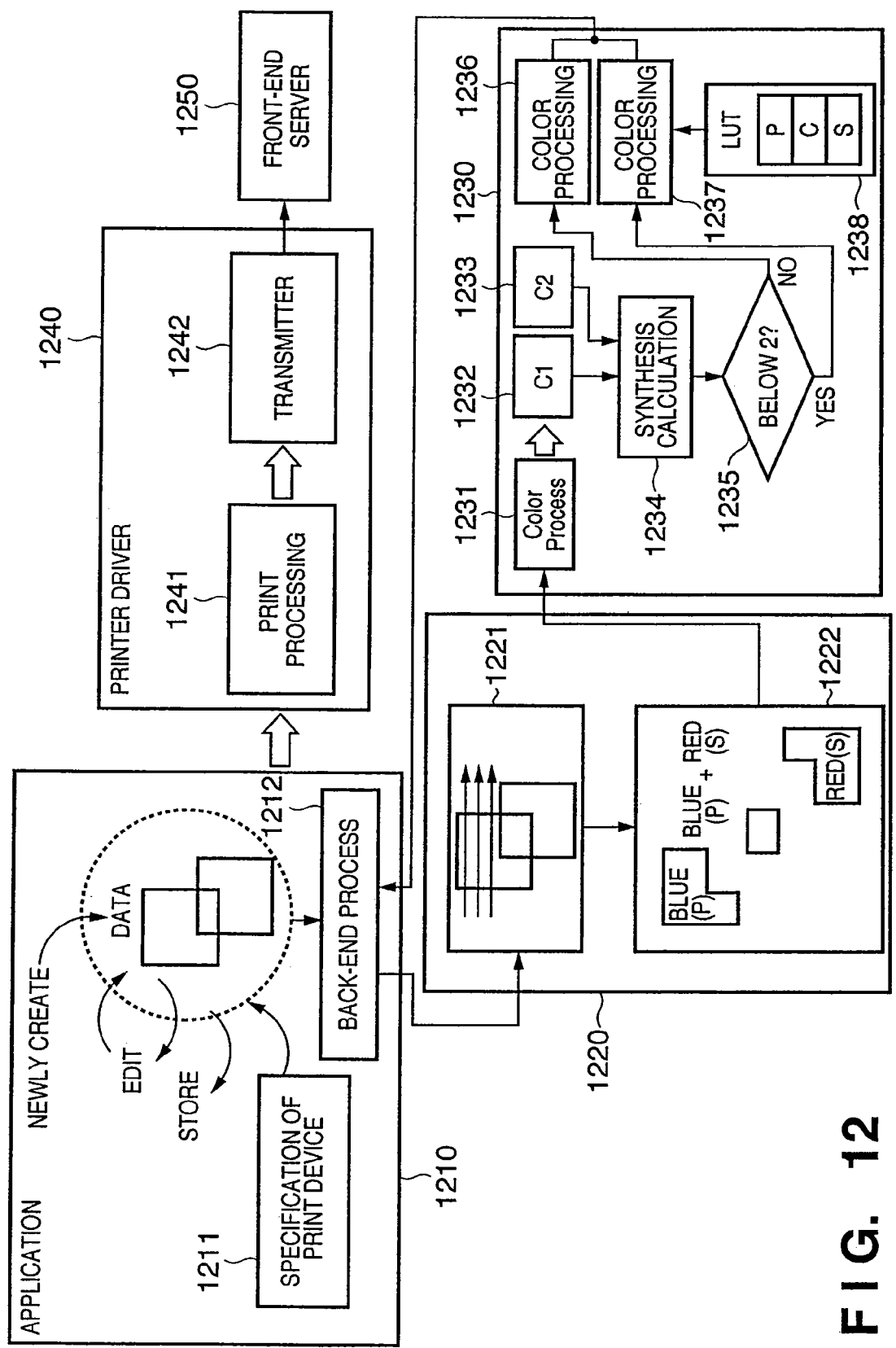
FIG. 12 is a block diagram showing the flow of processing of a data object in a sixth embodiment.

FIG. 12 is a block diagram showing the processing flow in the sixth embodiment. Similarly to the fifth embodiment, a document is created by a user selecting "newly create" from the application menu, and selecting and arranging objects such as characters and graphics. It is possible to perform editing work such as changing the form or arrangement of each object and store the document at appropriate timing during the creation thereof as required.

Here, description will be made on the case where, when an object such as a graphic is arranged during the work of creating a document, the object overlaps with an object already arranged. When the object has a transparency attribute under this condition, a back-end process 1212 is activated at appropriate timing to execute division processing for the overlapping portion. Here, in order to perform the division processing, appropriate object data is handed to a division block 1220.

In the division block 1220, search for an area where data is to be divided is executed first at a data scan block 1221. Then, at a divided data creation block 1222, the data is reconfigured to create divided data, as described in the second embodiment (FIG. 6). In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
WORK FLOW ID = 2
TYPE = COMPOSITING
NUMBER OF OBJECT WAS = 2
RGB1 =0.458824 0.733334 0.0, INTENT = priority on hue
RGB2 =0.0 0.458824 0.733334, INTENT = priority on
minimum color difference
LINE START FROM (300.0 50.0) (350.0 50.0), (350.0
100.0) (300.0 100.0)
END
}
```

Next, the object processed at the division block 1220 is handed to an image synthesis processing block 1230, and color synthesis processing is performed therefor. At the image synthesis processing block 1230, the number of objects is checked at a determination block 1235. Here, comparison is performed to determine whether the number of objects constituting the overlapping portion is larger than 2. The sixth embodiment is intended to provide correct color processing for an overlapping portion of objects. However, when the number of overlaps is equal to or larger than 3, the effect is often reduced. This results from the fact that drastic decrease of color saturation is caused by repeating mixture of colors many times.

At the same time, the processing time is slowed down in proportion to the number of objects. In the sixth embodiment, in order to avoid the delay of processing time, the composite color calculation processing is simplified for portions where the number of overlaps is equal to or larger than 3, and thereby, decrease of the processing speed is prevented. That is, the process branches to a normal color processing 1236 when the number of overlapping objects is equal to or larger than 3, and to a synthesis color processing 1237 in other cases.

In the case of the normal color processing 1236, the following calculation is performed for the color $(RDi, GDi, BDi)$ (i=1 to N) and the synthesis attribute $(\alpha Di, \alpha Di, \alpha Di)$ (i=1 to N) of each object to determine a composite color $(RF, GF, BF)$. This composite color is what is calculated at synthesis calculation 1234.

$$RF=\Sigma(RDi \times \alpha Di)/\Sigma(\alpha Di)$$

$$GF=\Sigma(GDi \times \alpha Di)/\Sigma(\alpha Di)$$

$$BF=\Sigma(BDi \times \alpha Di)/\Sigma(\alpha Di)$$

Next, the color matching processing is applied to $(RF, GF, BF)$ at 1236. In this case, the color matching method of an object arranged first is to be applied. For example, since the "priory on hue" method is specified for the data described above, this method is applied as the color matching processing for the composite color of the overlapping portion.

Here, if $(Rm, Gm, Bm)$ is obtained by applying the color matching processing of a matching method 1 to the composite color $(RF, GF, BF)$ obtained by the above-described calculation, then this value is returned to the back-end process 1212.

On the other hand, if the number of overlapping objects is equal to or smaller than 2, the process proceeds to the synthesis color processing 1237. Here, description will be made on the case where there are two objects in a synthesis area, and a different color and a different color matching method (rendering intent) are specified for each of them.

It is assumed that the specified color of a certain graphics object (for example, a rectangular image) is a color 1, that the RGB value=$(Rc, Gc, Bc)$ is assigned, and that transparency and synthesis attribute values are $\alpha 1$. It is also assumed that this graphics object is treated as a CG image, and that a "priory on hue" method (matching method 1) is specified as the matching method thereof.

The graphics object is assumed to overlap with the area of the picture image. In this picture image, the transparency and synthesis attribute is assumed to be $\alpha 2$. A "priority on minimum color difference" method (matching method 2) is specified as the color matching method thereof. In order to synthesize the picture image and the graphics data, it is necessary to execute synthesis calculation for each.

Here, description will be made on a calculation method used for the case where the pixel value of the image is a color 2, that is, the RGB value=$(Ri, Gi, Bi)$ as an example.

First, the following calculation is performed for the RGB value $(Rc, Sc, Bc)$ of the color 1 (1232) and the RGB value $(Ri, Gi, Bi)$ of the color 2 (1233) at synthesis calculation 1234 to determine the RGB value $(Rn, Gn, Bn)$ of a composite color.

$$Rn=(Rc \times \alpha 1 + Ri \times \alpha 2)/(\alpha 1 + \alpha 2)$$

$$Gn=(Gc \times \alpha 1 + Gi \times \alpha 2)/(\alpha 1 + \alpha 2)$$

$$Bn=(Bc \times \alpha 1 + Bi \times \alpha 2)/(\alpha 1 + \alpha 2)$$

Next, color matching processing is executed. By applying the color matching processing 1237 of the matching method 1 to the Rn, Gn, Bn obtained by the above-described calculation, $(R1, G1, B1)$ is obtained.

Separately from this, the color matching processing of a matching method 2 is applied to the Rn, Gn, Bn already obtained. By this calculation, $(R2, G2, B2)$ is obtained similarly. Then, the following calculation is applied to the two obtained RGB values, that is, $(R1, G1, B1)$ and $(R2, G2, B2)$.

$$Rm=(R1 \times (\alpha 1 \cdot W1) + R2 \times (\alpha 2 \cdot W2))/((W1 \cdot \alpha 1)+(\alpha 2 \cdot W2))$$

$$Gm=(G1 \times (\alpha 1 \cdot W1) + G2 \times (\alpha 2 \cdot W2))/((W1 \cdot \alpha 1)+(\alpha 2 \cdot W2))$$

$$Bm=(B1 \times (\alpha 1 \cdot W1) + B2 \times (\alpha 2 \cdot W2))/((W1 \cdot \alpha 1)+(\alpha 2 \cdot W2))$$

Wi (i=1, 2) is a weighting factor for each matching method, and it is associated with a variable THP as described below in an eighth embodiment. For example, when the value of THP is 2, the weighting factor of W1=1.0 is applied to the "priory on hue" method, and when the value of THP is 3, the weighting factor of W1=0.5 is applied to the "priory on hue" method.

The (Rm, Gm, Bm) calculated as described above is the value of the color of the overlapping area. This result is returned to the back-end process 1212 on the application side and stored within the document data as one of data elements constituting the document. When printing of the document is started by the application 1210, the data is handed to a printer driver 1240, and print data is created by print processing 1241 and handed to a front-end server 1250 from a transmitter 1242. At the front-end server 1250, rendering processing is executed appropriately to form a print image.

Even when different rendering intents are applied to multiple objects, and it is attempted to synthesize the objects, it is possible to perform suitable rendering intent processing. That is, in color conversion for performing conversion from a first color space to a second color space, which corresponds to multiple intents, calculation of a composite color is performed first, and after that, the color matching processing of the method 1 and the color matching processing of the method 2 is executed for the obtained composite color. Based on two different color matching colors obtained thereby, a color value calculated with the color matching colors and a weighting factor configured by a transparency attribute value is utilized, and thereby effective color reproduction can be realized.

In addition, it is possible to prevent decrease in the processing speed and the like, since a part of the processing is executed by a back-end process on the application side. Furthermore, as a result of examining division of an overlapping portion, normal composite color calculation is performed for such that the number of overlapping objects is below a specified number, and simple composite color calculation is executed in other cases. As a result, it is possible to perform processing without causing decrease in the processing speed even when a complicated document is processed.

As a result, the color change can be smoothly ensured, and an image giving a natural impression can be quickly formed.

[Seventh Embodiment]

Next, a seventh embodiment according to the present invention will be described in detail with reference to drawings.

In the seventh embodiment, description will be made on the case where the above-described color processing is incorporated in a host-side application, and the synthesis color processing is executed as an expanded image processing function.

Figure 13:
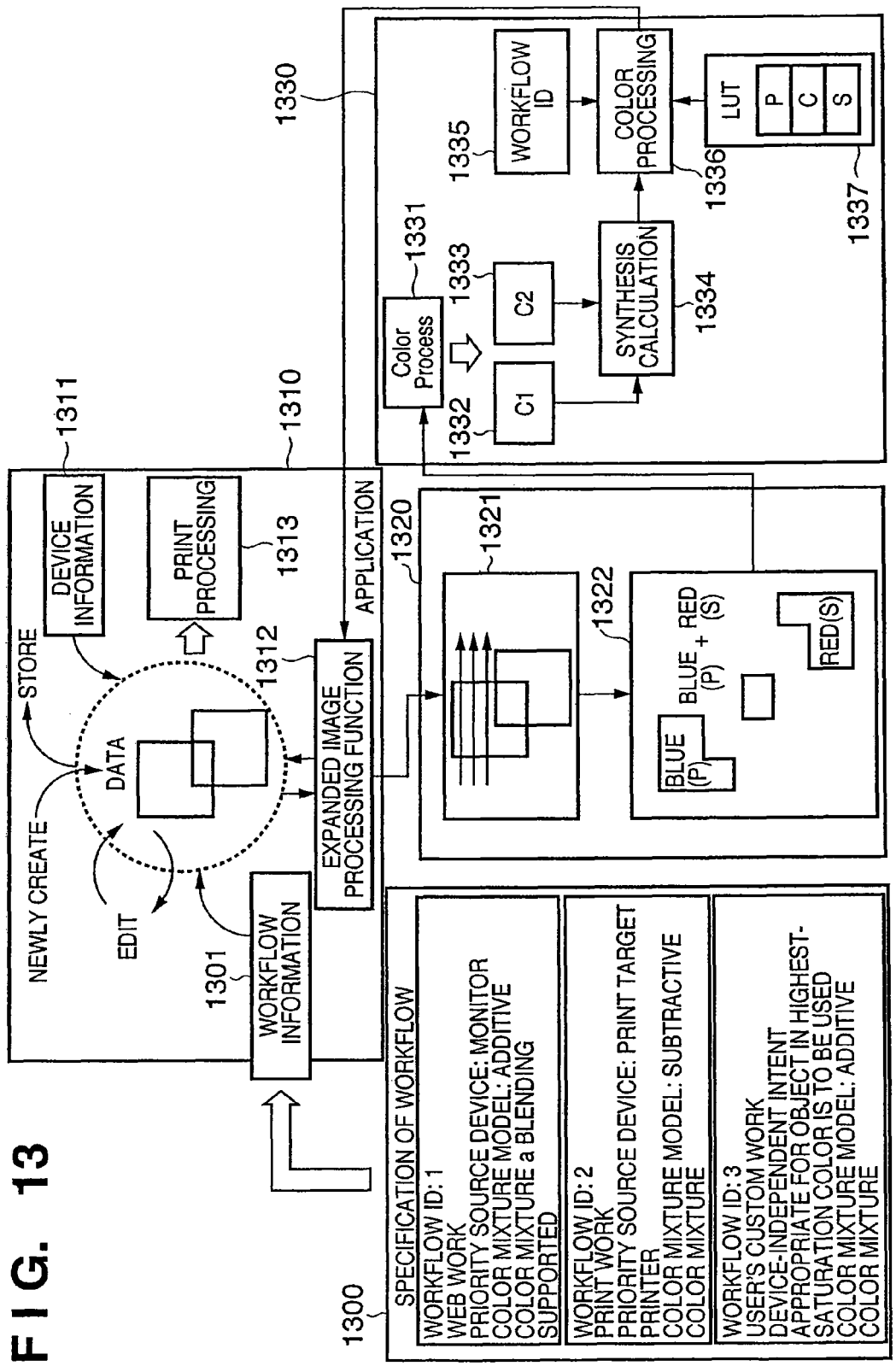
FIG. 13 is a block diagram showing the flow of processing of a data object in a seventh embodiment.

FIG. 13 is a block diagram showing the processing flow in a seventh embodiment. In FIG. 13, a document is created by a user selecting "newly create" from the application menu, and selecting and arranging objects such as characters and graphics. As shown in FIG. 13, it is possible to perform editing work such as changing the form or arrangement of each object and store the document at appropriate timing during the creation thereof as required.

In the system of the seventh embodiment, it is possible to define a workflow when document creation work is performed. Workflows are managed by a workflow information block 1301. If the purpose of creation of a document is to create WEB content, for example, then 1 is applied as a workflow ID, as shown in a workflow specification block 1300.

Similarly, if the purpose of creation of a document is to print the document, then 2 is applied as a workflow ID. Furthermore, in addition to the workflows prepared by the system, it is also possible to customize a workflow. In such a case, a workflow ID is assigned appropriately.

Here, description will be made on the processing performed in the case where, when an object such as a graphic is arranged in creation of a document with the workflow ID of 1, an object already arranged overlaps with another object. When the object has a transparency attribute under this condition, an expanded image processing function 1312 is called. In this expanded image processing function 1312, a plug-in type expanded function of processing an overlapping portion is provided for the system.

When the expanded function of interest is called by the application software, it is checked whether the expanded function exists or not, and the processing is continued if the expanded function is available. In order to execute division processing for the overlapping portion described above, appropriate object data is handed to a division block 1320 appropriately. In the division block 1320, search for an area where data is to be divided is executed first at a data scan block 1321.

At a divided data creation block 1322, the data is reconfigured based on the above-described search to create divided data. In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
WORK FLOW ID = 1
TYPE = COMPOSITING
NUMBER OF OBJECT WAS = 2
RGB1 =0.458824 0.733334 0, INTENT = CM1
RGB2 =0.0 0.458824 0.733334, INTENT = CM2
LINE START FROM (300.0 50.0) (350.0 50.0), (350.0 100.0) (300.0 100.0)
END
}
```

Next, the object processed at the divided data creation block 1322 is sent to an image synthesis processing block 1330, and color synthesis processing is performed. Here, description will be made on the case where a different color and a different color matching method (rendering intent) are specified for each of two objects 1332 and 1333.

When a certain graphics object (for example, a rectangular image) is given, RGB pixels are developed in the rectangular area. Here, it is assumed that the specified color at all the pixels in the rectangular area is a color 1, that the RGB value=(Rc, Gc, Bc) is assigned, and that all the transparency and synthesis attribute values in the area are α1. It is also assumed that this graphics object is treated as a CG image, and that a "priory on hue" method (matching method 1) is specified as the color matching method thereof.

It is assumed that, when the graphics object is arranged on a print page, it overlaps with the area of the picture image. The picture image is configured by pixel values (RGB), and it is assumed that all the transparency and synthesis attribute values of all the pixels of the picture image are α2. A "priority on minimum color difference" method (matching method 2) is specified as the color matching method thereof.

In order to synthesize the picture image and the graphics data, it is necessary to repeat synthesis calculation for each pixel by referring to the positional information about the pixel appropriately.

Here, description will be made on a calculation method used for the case where the pixel value of the image is a color 2, that is, the RGB value is (Ri, Gi, Bi) as an example.

First, the following calculation is performed for the RGB value (Rc, Gc, Bc) of the color 1 (1332) and the RGB value (Ri, Gi, Bi) of the color 2 (1333) at synthesis calculation 1334 to determine the RGB value (Rn, Gn, Bn) of a composite color.

$$Rn=(Rc \times \alpha 1 + Ri \times \alpha 2)/(\alpha 1 + \alpha 2)$$

$$Gn=(Gc \times \alpha 1 + Gi \times \alpha 2)/(\alpha 1 + \alpha 2)$$

$$Bn=(Bc \times \alpha 1 + Bi \times \alpha 2)/(\alpha 1 + \alpha 2)$$

Next, color matching processing 1336 is executed. By applying the color matching processing of a matching method 1 to the Rn, Gn, Bn obtained by the above-described calculation, (R1, G1, B1) is obtained.

Separately from this, the color matching processing of a matching method 2 is applied to the Rn, Gn, Bn already obtained. By this calculation, (R2, G2, B2) is obtained similarly. Then, the following calculation is applied to the two obtained RGB values, that is, (R1, G1, B1) and (R2, G2, B2). By using LUT 1337 for this calculation, the calculation speed can be increased.

$$Rm=(R1 \times (\alpha 1 \cdot W1) + R2 \times (\alpha 2 \cdot W2))/((W1 \cdot \alpha 1)+(\alpha 2 \cdot W2))$$

$$Gm=(G1 \times (\alpha 1 \cdot W1) + G2 \times (\alpha 2 \cdot W2))/(((W1 \cdot \alpha 1)+(\alpha 2 \cdot W2))$$

$$Bm=(B1 \times (\alpha 1 \cdot W1) + B2 \times (\alpha 2 \cdot W2))/((W1 \cdot \alpha 1)+(\alpha 2 \cdot W2))$$

Wi (i=1, 2) is a weighting factor for each matching method, and it is associated with a workflow ID 1335. For example, when the workflow ID is "1", the weighting factor of W1=1.0 is applied to the "priory on hue" method, and when the workflow ID is "2", the weighting factor of W1=0.5 is applied to the "priory on hue" method. The above-described workflow is configured to provide the optimum combination of a synthesis method (alpha blend, subtractive color mixture or additive color mixture) and a color matching method according to what purpose the image is created for. In FIG. 13, a user's custom work can be selected as a workflow, in which a combination of a synthesis method and a color matching method to a user's taste is registered. With the workflow ID1, a monitor is defined by default as a device (source device) that inputs an image to the input section in FIG. 1, and the alpha blend is performed as the blending. With the workflow ID2, a print target printer is defined by default as a device (source device) that inputs an image to the input section in FIG. 1, and the subtractive color mixture is performed as the blending.

With the workflow ID3, a user customizes as desired.

The (Rm, Gm, Bm) calculated as described above is the value of the color of the overlapping area. Therefore, this result is returned to the expanded image processing function 1312 of on the application side and stored within the document data as one of data elements constituting the document. When printing of the document is started by the application, the processed data is handed to a printer, and rendering processing is executed appropriately to form a print image.

[Eighth Embodiment]

Next, an eighth embodiment according to the present invention will be described in detail with reference to drawings.

Figure 14:
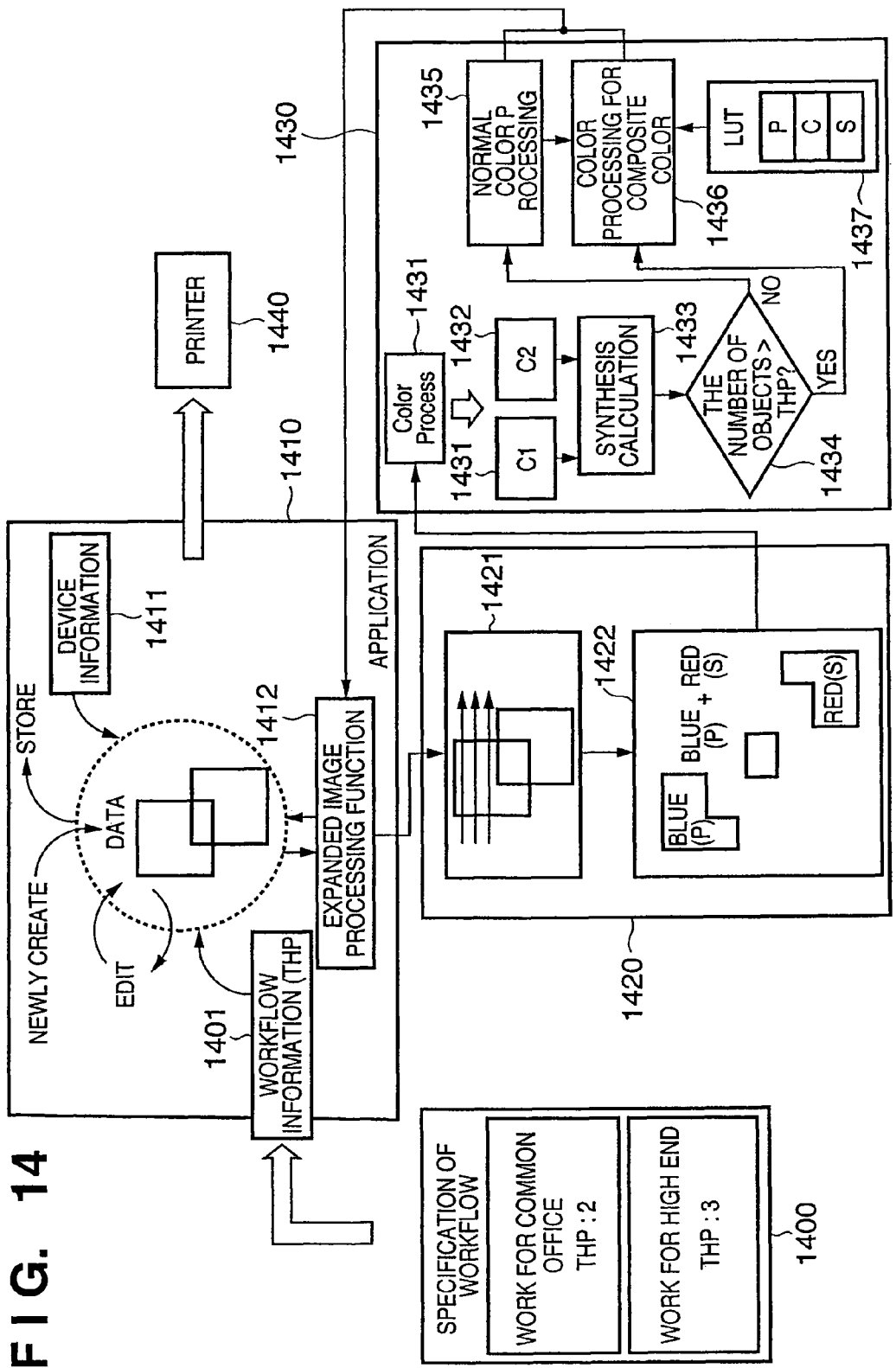
FIG. 14 is a block diagram showing the flow of processing of a data object in an eighth embodiment.

FIG. 14 is a block diagram showing the processing flow in the eighth embodiment. Similarly to the seventh embodiment, a document is created by a user selecting "newly create" from the application menu, and selecting and arranging objects such as characters and graphics. As shown in FIG. 14, it is possible to perform editing work such as changing the form or arrangement of each object and store the document at appropriate timing during the creation thereof as required.

In the system of the eighth embodiment, it is possible to define a workflow when document creation work is performed. Workflows are managed by a workflow information block 1401. If the purpose of creation of a document is to create "a document for a common office", for example, then 2 is substituted for a variable THP, as shown in a workflow specification block 1400.

Similarly, if the purpose of creation of a document is to perform high-end print such as POD print, then 3 is substituted for the variable THP.

Here, description will be made on the case where, when an object such as a graphic is arranged in the case of creating a document, the object overlaps with an object already arranged. When the object has a transparency attribute under this condition, an expanded image processing function 1412 is called to execute division processing for the overlapping portion.

In order to perform the division processing, appropriate object data is handed to a division block 1420. In the division block 1420, search for an area where data is to be divided is executed first at a data scan block 1421.

At a divided data creation block 1422, the data is reconfigured to create divided data, as described in the second embodiment (FIG. 6). In this case, as for an overlapping portion, the data of the overlapping portion is registered while each information of a color 1 and the rendering intent of an object having the color 1, and a color 2 and the rendering intent of an object having the color 2 is held. For example, data as shown below is generated.

```
FILL {
WORK FLOW ID = 2
TYPE = COMPOSITING
NUMBER OF OBJECT WAS = 2
RGB1 =0.458824 0.733334 0.0, INTENT = priority on hue
RGB2 =0.0 0.458824 0.733334, INTENT = priority on
minimum color difference
LINE START FROM (300.0 50.0) (350.0 50.0), (350.0
100.0) (300.0 100.0)
END
}
```

Next, the object processed at the divided data creation block 1422 is sent to an image synthesis processing block 1430, and color synthesis processing is performed. At the image synthesis processing block 1430, processing is performed similarly to the seventh embodiment, and the value of the THP variable is checked at determination 1434. Here, the number of objects constituting the overlapping portion and the THP variable is compared. Here, the process proceeds to a normal color processing 1435 when the number of overlapping objects is smaller than the THP, and to a color processing for composite color 1436 in other cases.

In the normal color processing 1435, the following calculation is performed for the color (RDi, GDi, BDi) (i=1 to N)

and the synthesis attribute ($\alpha Di$, $\alpha Di$, $\alpha Di$) (i=1 to N) of each object to determine a composite color (RF, GF, BF).

$$RF=\Sigma(RDi \times \alpha Di)/\Sigma(\alpha Di)$$

$$GF=\Sigma(GDi \times \alpha Di)/\Sigma(\alpha Di)$$

$$BF=\Sigma(BDi \times \alpha Di)/\Sigma(\alpha Di)$$

Next, the color matching processing is applied to (RF, GF, BF) at 1436. In this case, the color matching method of an object arranged first is to be applied. For example, since the "priory on hue" method is specified for the data described above, this method is applied as the color matching processing for composite color of the overlapping portion.

Here, if (Rm, Gm, Bm) is obtained by applying the color matching processing of a matching method 1 to the composite color (RF, GF, BF) obtained by the above-described calculation, then this value is returned to the expanded image processing function 1412.

On the other hand, if the number of overlapping objects is equal to or larger than THP, the process proceeds to the color processing for composite color 1436. Here, description will be made on the case where there are two objects in a synthesis area, and a different color and a different color matching method (rendering intent) are specified for each of them.

It is assumed that the specified color of a certain graphics object (for example, a rectangular image) is a color 1, that the RGB value is assigned as (Rc, Gc, Bc), and that transparency and synthesis attribute values are $\alpha 1$. It is also assumed that this graphics object is treated as a CG image, and that a "priory on hue" method (matching method 1) is specified as the matching method thereof.

The graphics object is assumed to overlap with the area of the picture image. The transparency and synthesis attribute in the picture image is assumed to be $\alpha 2$. A "priority on minimum color difference" method (matching method 2) is specified as the color matching method thereof. In order to synthesize the picture image and the graphics data, it is necessary to execute synthesis calculation for each.

Here, description will be made on a calculation method used for the case where the pixel value of the picture image is a color 2, that is, the RGB value is (Ri, Gi, Bi) as an example.

First, the following calculation is performed for the RGB value (Rc, Gc, Bc) of the color 1 and the RGB value (Ri, Gi, Bi) of the color 2 to determine the RGB value (Rn, Gn, Bn) of a composite color.

$$Rn=(Rc \times \alpha 1 + Ri \times \alpha 2)/(\alpha 1 + \alpha 2)$$

$$Gn=(Gc \times \alpha 1 + Gi \times \alpha 2)/(\alpha 1 + \alpha 2)$$

$$Bn=(Bc \times \alpha 1 + Bi \times \alpha 2)/(\alpha 1 + \alpha 2)$$

Next, color matching processing is executed. By applying the color matching processing of a matching method 1 to the Rn, Gn, Bn obtained by the above-described calculation, (R1, G1, B1) is obtained.

Separately from this, the color matching processing of a matching method 2 is applied to the Rn, Gn, Bn already obtained. By this calculation, (R2, G2, B2) is obtained similarly. Then, the following calculation is applied to the two obtained RGB values, that is, (R1, G1, B1) and (R2, G2, B2).

$$Rm=(R1 \times (\alpha 1 \cdot W1) + R2 \times (\alpha 2 \cdot W2))/((W1 \cdot \alpha 1) + (\alpha 2 \cdot W2))$$

$$Gm=(G1 \times (\alpha 1 \cdot W1) + G2 \times (\alpha 2 \cdot W2))/((W1 \cdot \alpha 1) + (\alpha 2 \cdot W2))$$

$$Bm=(B1 \times (\alpha 1 \cdot W1) + B2 \times (\alpha 2 \cdot W2))/((W1 \cdot \alpha 1) + (\alpha 2 \cdot W2))$$

Wi (i=1, 2) is a weighting factor for each matching method, and it is associated with a variable THP. For example, when the THP value is 2, the weighting factor of W1=1.0 is applied to the "priory on hue" method, and when the value of THP is 3, the weighting factor of W1=0.5 is applied to the "priory on hue" method.

The (Rm, Gm, Bm) calculated as described above is the value of the color of the overlapping area. Therefore, this result is returned to the expanded image processing function 1412 on the application side and stored within the document data as one of data elements constituting the document. When printing of the document is started by the application, the data is handed to a printer, and rendering processing is executed appropriately to form a print image.

As described above, even when different rendering intents are applied to multiple objects, and it is attempted to synthesize the objects, it is possible to perform suitable rendering intent processing.

That is, in color conversion for performing conversion from a first color space to a second color space, which corresponds to multiple intents, calculation of a composite color is performed first, and after that, each of the color matching processing of the method 1 and the color matching processing of the method 2 is provided for the obtained composite color. Based on two different color matching colors obtained thereby, a color value calculated with the color matching colors and a weighting factor configured by a transparency attribute value is utilized, and thereby effective color reproduction can be realized.

Furthermore, when the above-described processing is realized, a part of the processing is executed on the application side (as a part of an expanded function), and workflow information is added to a print job. Thereby, it is possible to apply the optimum processing to each workflow while preventing decrease in the processing speed.

Furthermore, based on the workflow information, composite color calculation is performed for those for which the number of overlapping objects has been determined to be below a specified number, and simple composite color calculation is executed in other cases. Thereby, it is possible to perform processing without causing decrease in the processing speed even when a complicated document is processed.

The present invention may be applied to a system configured by multiple pieces of equipment (for example, a host computer, interface equipment, a reader, a printer and the like) or an apparatus configured by one piece of equipment (for example, a copying machine, a facsimile apparatus and the like).

It goes without saying that the objects of the present invention can be achieved by providing a recording medium in which a program code of software for realizing the functions of the embodiment described above is recorded to a system or an apparatus, and by the computer (CPU or MPU) of the system or the apparatus reading and executing the program code stored in the recording medium.

In this case, the program code itself which has been read from the recording medium realizes the functions of the embodiments described above, and the recording medium in which the program code is stored constitutes the present invention.

As the recording medium for providing the program code, for example, a floppy (registered trademark) disk, hard disk, optical disk, magneto-optical disk, CD-ROM, CD-R, magnetic tape, non-volatile memory card, ROM and the like can be used.

It is not only by executing the program code read by a computer that the functions of the embodiments described above can be realized. It goes without saying that the case is also included where the functions of the embodiments described above are realized by an OS (operating system) or the like, which is operating on the computer, performing a part or all of the actual processing based on the instructions of the program code.

Furthermore, it goes without saying that the case is also included where the program code read from the recording medium is written in a memory provided for a feature expansion board inserted in the computer or a feature expansion unit connected to the computer, and then the functions of the embodiments described above are realized by the CPU or the like provided for the feature expansion board or the feature expansion unit performing a part or all of the actual processing based on the instructions of the program code.

The present invention has been described using preferred embodiments. The present invention, however, is not limited to the above-described embodiments, and various variations are possible within the scope of the description in the claims.

This application claims the benefit of Japanese Patent Application Nos. 2005-167343 filed on Jun. 7, 2006, 2005-167344 filed on Jun. 7, 2006, and 2005-167345 filed on Jun. 7, 2006, which are hereby incorporated by reference herein in their entirety.

What is claimed is:

1. An image processing method comprising:
   using a processor to perform:
   a step of performing first and second color matching processing for a first object, which corresponds to a first transparency synthesis attribute, by a first color matching method and a second color matching method different from the first color matching method, and of performing first and second color matching processing for a second object, which corresponds to a second transparency synthesis attribute and is different from the first object, by the first color matching method and the second color matching method;
   an intermediate color processing step of performing a first calculation for results of the first and second color matching processing for the first object by using the first and second transparency synthesis attributes, and of performing a second calculation for results of the first and second color matching processing for the second object by using the first and second transparency synthesis attributes; and
   a synthesis color processing step of synthesizing the results of the first calculation and the second calculation by using the first and second transparency synthesis attributes.

2. An image processing method comprising:
   using a processor to perform:
   a synthesis color processing step of performing processing for a first object, which corresponds to a first transparency synthesis attribute, using the first transparency synthesis attribute, performing processing for a second object, which corresponds to a second transparency synthesis attribute and is different from the first object, using the second transparency synthesis attribute, and synthesizing results of the processing using the first and second transparency synthesis attributes;
   a step of performing color matching processing for the objects for which the synthesis color processing has been performed, using a first color matching method and a second color matching method; and
   a transparency synthesis processing step of performing transparency synthesis processing for a result of the first color matching processing and a result of the second color matching processing, using the first and second transparency synthesis attributes.

3. An image processing apparatus comprising:
   means for performing first and second color matching processing for a first object, which corresponds to a first transparency synthesis attribute, by a first color matching method and a second color matching method different from the first color matching method, and of performing first and second color matching processing for a second object, which corresponds to a second transparency synthesis attribute and is different from the first object, by the first color matching method and the second color matching method;
   intermediate color processing means for performing a first calculation for results of the first and second color matching processing for the first object by using the first and second transparency synthesis attributes, and of performing a second calculation for results of the first and second color matching processing for the second object by using the first and second transparency synthesis attributes; and
   synthesizing means for synthesizing the results of the first calculation and the second calculation by using the first and second transparency synthesis attributes.

4. An image processing apparatus comprising:
   synthesis color processing means for performing processing for a first object, which corresponds to a first transparency synthesis attribute, using the first transparency synthesis attribute, performing processing for a second object, which corresponds to a second transparency synthesis attribute and is different from the first object, using the second transparency synthesis attribute, and synthesizing results of the processing using the first and second transparency synthesis attributes;
   means for performing color matching processing for the objects for which the synthesis color processing has been performed, using a first color matching method and a second color matching method; and
   means for performing transparency synthesis processing for a result of the first color matching processing and a result of the second color matching processing, using the first and second transparency synthesis attributes.

5. A non-transitory computer-readable storage medium storing a computer-executable program for causing a computer to perform an image processing method, the method comprising:
   using a processor to perform:
   a step of performing first and second color matching processing for a first object, which corresponds to a first transparency synthesis attribute, by a first color matching method and a second color matching method different from the first color matching method, and of performing first and second color matching processing for a second object, which corresponds to a second transparency synthesis attribute and is different from the first object, by the first color matching method and the second color matching method;
   an intermediate color processing step of performing a first calculation for results of the first and second color matching processing for the first object by using the first and second transparency synthesis attributes, and of performing a second calculation for results of the first and second color matching processing for the second object by using the first and second transparency synthesis attributes; and a synthesis color processing step of synthesizing the results of the first calculation and the second calculation by using the first and second transparency synthesis attributes.

6. A non-transitory computer-readable storage medium storing a computer-executable program for causing a computer to perform an image processing method, the method comprising:

using a processor to perform:
a synthesis color processing step of performing processing for a first object, which corresponds to a first transparency synthesis attribute, using the first transparency synthesis attribute, performing processing for a second object, which corresponds to a second transparency synthesis attribute and is different from the first object, using the second transparency synthesis attribute, and synthesizing results of the processing using the first and second transparency synthesis attributes;

a step of performing color matching processing for the objects for which the synthesis color processing has been performed, using a first color matching method and a second color matching method; and a transparency synthesis processing step of performing transparency synthesis processing for a result of the first color matching processing and a result of the second color matching processing, using the first and second transparency synthesis attributes.

* * * * *